US012620161B2

(12) United States Patent
Smith-Lacey et al.

(10) Patent No.: US 12,620,161 B2

(45) Date of Patent: **\*May 5, 2026**

(54) RAY TRACING USING COMPRESSED RAY DATA REPRESENTATION FOR A RAY HAVING THREE DIRECTION COMPONENTS AND THREE POSITION COMPONENTS

(71) Applicant: Imagination Technologies Limited, Kings Langley (GB)

(72) Inventors: Peter Smith-Lacey, Hertfordshire (GB); Simon Fenney, Hertfordshire (GB)

(73) Assignee: Imagination Technologies Limited, Kings Langley (GB)

( \* ) Notice: Subject to any disclaimer, the term of this patent is extended or adjusted under 35 U.S.C. 154(b) by 177 days.

This patent is subject to a terminal disclaimer.

(21) Appl. No.: 18/373,112

(22) Filed: Sep. 26, 2023

(65) Prior Publication Data

US 2024/0161385 A1 May 16, 2024

(30) Foreign Application Priority Data

Sep. 27, 2022 (GB) ..................................... 2214122
Sep. 27, 2022 (GB) ..................................... 2214124

(51) Int. Cl.
G06T 15/06 (2011.01)

(52) U.S. Cl.
CPC .......... G06T 15/06 (2013.01); *G06T 2210/21* (2013.01)

(58) Field of Classification Search
None
See application file for complete search history.

(56) References Cited

U.S. PATENT DOCUMENTS 8,284,188 B1 10/2012 Lauterbach et al.
2010/0077010 A1 3/2010 Aila et al.
(Continued)

FOREIGN PATENT DOCUMENTS

CN 109887013 A 6/2019
CN 114742933 A 7/2022
(Continued)

OTHER PUBLICATIONS

Roodak et al., Compressed Geometric Arrays for Point Cloud Processing, 2021, 17 pages, downloaded from https://arxiv.org/pdf/2110.11616 on May 20, 2025 (Year: 2021).\*
(Continued)

*Primary Examiner* — Haixia Du

(74) *Attorney, Agent, or Firm* — Potomac Law Group, PLLC; Vincent M DeLuca

(57) ABSTRACT

A computer implemented method converts ray data for a ray into a ray representative, wherein the ray representative is a compressed representation of the ray data, and wherein the ray data comprises three direction components and three position components for the ray. The method comprises identifying which of the three direction components of the ray data has the greatest magnitude, and defining the axis of the identified direction component as the major axis of the ray. The method further comprises determining a translated position on the ray at which the position component along the major axis is zero, and rescaling the three direction components of the ray so that the magnitude of the direction component along the major axis is one. The ray representative comprises: (i) the two position components of the translated position along the axes which are not the major axis, and (ii) the two rescaled direction components along the axes which are not the major axis.

19 Claims, 9 Drawing Sheets

(56)     References Cited

U.S. PATENT DOCUMENTS

| | | | |
|---|---|---|---|
| 2017/0249771 A1 | 8/2017 | Obert et al. | |
| 2019/0236832 A1 | 8/2019 | Peterson et al. | |
| 2020/0051314 A1* | 2/2020 | Laine | G06T 15/005 |
| 2020/0211259 A1* | 7/2020 | Apodaca | G06F 7/14 |
| 2021/0383591 A1 | 12/2021 | Gupta et al. | |
| 2022/0230380 A1 | 7/2022 | Laine et al. | |
| 2023/0126531 A1* | 4/2023 | Croxford | G06T 15/06 |
| | | | 345/418 |

FOREIGN PATENT DOCUMENTS

| | | | |
|---|---|---|---|
| GB | 2617219 A | 10/2023 | |
| WO | 2009063319 A2 | 5/2009 | |
| WO | 2016/160334 A1 | 10/2016 | |

OTHER PUBLICATIONS

Havran et al; "LCTS:Ray Shooting using Longest Common Traversal Sequences"; Journal of the European Associate for Computer Graphics; vol. 19; No. Dec. 24, 2001; pp. 59-70; pp. 1-12.
Hendrich et al; "Ray Classification for Accelerated BVH Traversal"; Journal of the European Associate for Computer Graphics; vol. 38; No. 4; Jul. 30, 2019; pp. 1-8.

* cited by examiner

700A 702  704  706  708  710

| MAJ | POSU | DIRU | POSV | DIRV |

700B 702  704  706  708  710  712  714

| MAJ | POSU | DIRU | POSV | DIRV | RNG0 | RNG1 |

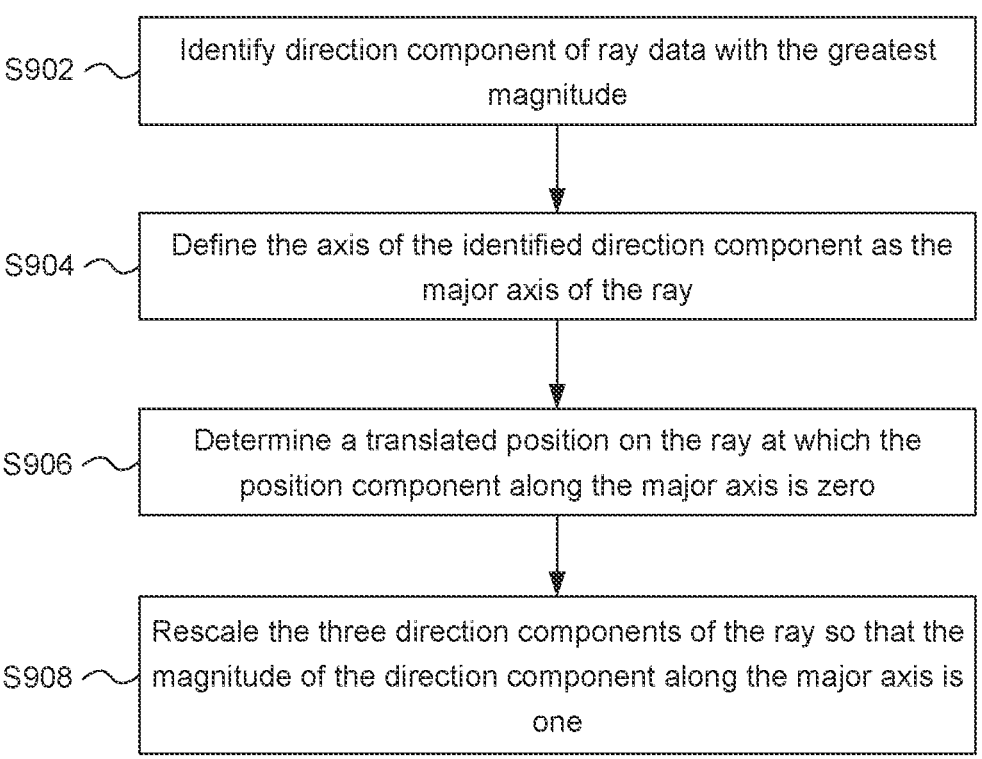

S902 — Identify direction component of ray data with the greatest magnitude

S904 — Define the axis of the identified direction component as the major axis of the ray S906 — Determine a translated position on the ray at which the position component along the major axis is zero S908 — Rescale the three direction components of the ray so that the magnitude of the direction component along the major axis is one

FIGURE 9

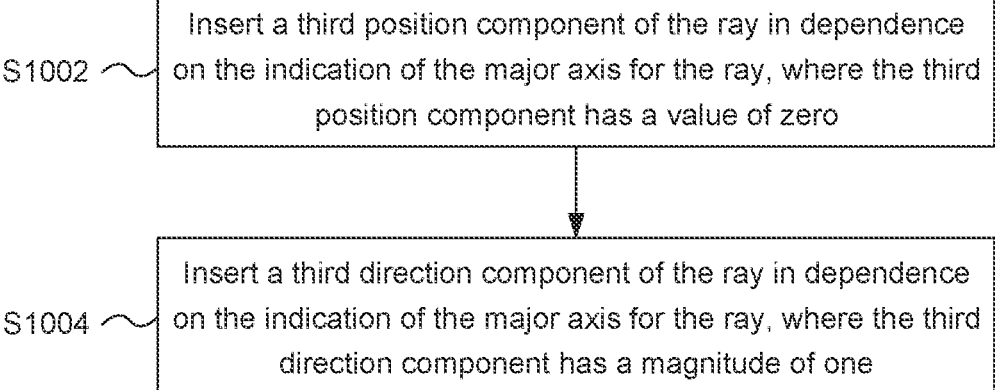

S1002 — Insert a third position component of the ray in dependence on the indication of the major axis for the ray, where the third position component has a value of zero S1004 — Insert a third direction component of the ray in dependence on the indication of the major axis for the ray, where the third direction component has a magnitude of one

FIGURE 10

RAY TRACING USING COMPRESSED RAY DATA REPRESENTATION FOR A RAY HAVING THREE DIRECTION COMPONENTS AND THREE POSITION COMPONENTS

CROSS-REFERENCE TO RELATED APPLICATIONS AND CLAIM OF PRIORITY

This application claims foreign priority under 35 U.S.C. 119 from United Kingdom patent application Nos. GB 2214122.0 and GB 2214124.6, both filed on 27 Sep. 2022, which are herein incorporated by reference in their entirety.

BACKGROUND

Ray tracing is a computational rendering technique for generating an image of a scene by tracing paths of light usually from the viewpoint of a camera through the scene. The paths of light that are traced through the scene are referred to as rays. Each ray to be traced is modelled as originating from a viewpoint of the scene and passes through a pixel into the scene. As a ray traverses the scene it may intersect objects within the scene. The interaction between a ray and an object it intersects can be modelled to create realistic visual effects. For example, in response to determining an intersection of a ray with an object, a shader program may be executed in respect of the intersection. The shader program is a portion of computer code. A programmer can write the shader program to define how the system reacts to the intersection which may, for example cause one or more secondary rays to be emitted into the scene. Alternatively, the shader program could cause one or more rays to be emitted into the scene for the purposes of determining whether the object is in shadow at the intersection point.

Rendering an image of a scene using ray tracing may involve a large number of intersection tests. In real-life ray tracing systems, billions of intersection tests may be performed to render a single image of a scene. In order to reduce the number of intersection tests that need to be performed, ray tracing systems can generate acceleration structures. An acceleration structure comprises a number of nodes, with each node representing a region (e.g., volume) within the scene. Acceleration structures are often hierarchical, forming a tree-like structure, such that they include multiple levels of nodes. The nodes near the top of the acceleration structure represent relatively large regions in the scene. For example, the root node of the acceleration structure may represent the whole scene. Nodes near the bottom of the acceleration structure represent relatively small regions in the scene. Leaf nodes of the acceleration structure represent regions that at least partially bound one or more primitives (e.g., triangles) in the scene, and comprise pointers to their bounded primitives.

Intersection testing is traditionally performed for a ray using the acceleration structure by first testing the ray for intersection with the root node of the acceleration structure. If the ray is found to intersect a parent node, such as the root node, testing can then proceed to the child nodes of that parent. In contrast, if the ray is found not to intersect a parent node, intersection testing of the child nodes of that parent node can be avoided, minimising computational intensity. If a ray is found to intersect a leaf node, then it can be tested against the objects within the region represented by the leaf node to thereby determine which object(s) the ray intersects with. The objects may be represented using primitives. A primitive denotes a unit of geometry in the system.

Ray tracing operations are typically highly computationally intensive. The intensive nature of these operations means that there is a desire to increase the speed of, or decrease latency associated with, these operations. Further improvements that can be made to ray tracing technologies include a decrease in the hardware area required to perform the processing operations.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

There is provided a computer implemented method for converting ray data for a ray into a ray representative, wherein the ray representative is a compressed representation of the ray data, and wherein the ray data comprises three direction components and three position components for the ray, the method comprising:

identifying which of the three direction components of the ray data has the greatest magnitude, and defining the axis of the identified direction component as the major axis of the ray;

determining a translated position on the ray at which the position component along the major axis is zero; and rescaling the three direction components of the ray so that the magnitude of the direction component along the major axis is one;

wherein the ray representative comprises: (i) the two position components of the translated position along the axes which are not the major axis, and (ii) the two rescaled direction components along the axes which are not the major axis.

The ray representative may comprise exactly two direction components and exactly two position components.

The ray representative may further comprise an indication of the major axis.

The indication of the major axis may comprise two bits.

The ray data may further comprise a minimum distance component and a maximum distance component, and the method may further comprise rescaling the minimum and maximum distance components based on the translated position and on the rescaling of the three direction components of the ray.

The rescaling of the three direction components of the ray may be such that the value of the direction component along the major axis is plus one.

The method may further comprise converting the ray representative into a quantised ray identifier by generating a data packet for the ray representative that includes data that indicates the major axis of the ray, the two position components of the translated position and the two rescaled direction components.

The quantised ray identifier may have a fixed bit-width.

The data in the data packet for the quantised ray identifier may comprise no more than three bits to indicate each of said two rescaled direction components along the axes which are not the major axis.

The data in the data packet for the quantised ray identifier may comprise no more than five bits to indicate each of said two position components of the translated position along the axes which are not the major axis.

The quantised ray identifier may identify a set of rays, each ray of the set of rays comprising similar position and direction components.

The method may further comprise generating a hash of the quantised ray identifier to represent the ray representative.

The method may further comprise generating the hash comprises performing logical XOR operations on the bits of the quantised ray identifier to reduce the number of bits of the quantised ray identifier.

The hash may comprise eight bits.

The ray representative may be used to store an indication of the ray in a cache, the cache being used to store data for intersection testing that is used by the ray tracing system to render an image of a scene.

There is provided a computer system for converting ray data for a ray into a ray representative, wherein the ray representative is a compressed representation of the ray data, wherein the ray data comprises three direction components and three position components for the ray, the computer system comprising processing logic configured to:

identify which of the three direction components of the ray data has the greatest magnitude, and define the axis of the identified direction component as the major axis of the ray;

determine a translated position on the ray at which the position component along the major axis is zero; and rescale the three direction components of the ray so that the magnitude of the direction component along the major axis is one;

wherein the ray representative comprises: (i) the two position components of the translated position along the axes which are not the major axis, and (ii) the two rescaled direction components along the axes which are not the major axis.

The ray representative may comprise exactly two direction components and exactly two position components.

The ray representative may further comprise an indication of the major axis.

The ray data may further comprise a minimum distance component and a maximum distance component, and the processing logic may be further configured to rescale the minimum and maximum distance components based on the translated position and on the rescaling of the three direction components of the ray.

The processing logic may be further configured to convert the ray representative into a quantised ray identifier by generating a data packet for the ray representative that includes data that indicates the major axis of the ray, the two position components of the translated position and the two rescaled direction components.

The computer system may further comprise a cache, wherein the ray representative is used to store an indication of the ray in the cache and wherein the ray tracing system is configured to retrieve data from the cache for intersection testing that is used to render an image of a scene.

There is provided a computer implemented method for converting a ray representative into ray data for a ray, wherein the ray representative is a compressed representation of the ray data and comprises: (i) two position components of the translated position of the ray, (ii) two direction components for the ray, and (iii) an indication of the major axis for the ray, the method comprising:

inserting a third position component of the ray in dependence on the indication of the major axis for the ray, where the third position component has a value of zero; and inserting a third direction component of the ray in dependence on the indication of the major axis for the ray, where the third direction component has a magnitude of one.

The ray representative may be generated according to any of the methods described herein.

The method may further comprise adding further bits to each of the two direction components and the two position components of the ray representative, wherein the further bits are least significant bits.

The ray representative may further comprise a minimum distance component and a maximum distance component, and the method may further comprise adding further bits to each of the minimum distance component and the maximum distance component, wherein the further bits are least significant bits.

The method may further comprise adding a sign to the third direction component to the ray data in dependence on the minimum distance component and the maximum distance component.

The method may further comprise reordering the minimum and maximum distance components to determine which of the two components is closest to the origin of the ray.

There is provided a computer system for converting a ray representative into ray data for a ray, wherein the ray representative is a compressed representation of the ray data and comprises: (i) two position components of the translated position of the ray, (ii) two direction components for the ray, and (iii) an indication of the major axis for the ray, the computer system comprising processing logic configured to:

insert a third position component of the ray in dependence on the indication of the major axis for the ray, where the third position component has a value of zero; and insert a third direction component of the ray in dependence on the indication of the major axis for the ray, where the third direction component has a magnitude of one.

The computer system may be a ray tracing system.

There may be provided a computer system configured to perform any of the methods described herein.

The computer systems described herein may be embodied in hardware on an integrated circuit. There may be provided a method of manufacturing, at an integrated circuit manufacturing system, a computer system as described herein. There may be provided an integrated circuit definition dataset that, when processed in an integrated circuit manufacturing system, configures the system to manufacture a computer system as described herein. There may be provided a non-transitory computer readable storage medium having stored thereon a computer readable description of a computer system as described herein that, when processed in an integrated circuit manufacturing system, causes the integrated circuit manufacturing system to manufacture an integrated circuit embodying the computer system.

There may be provided an integrated circuit manufacturing system comprising: a non-transitory computer readable storage medium having stored thereon a computer readable description of a computer system as described herein; a layout processing system configured to process the computer readable description so as to generate a circuit layout description of an integrated circuit embodying the computer system; and an integrated circuit generation system configured to manufacture the computer system according to the circuit layout description.

There may be provided a computer-implemented method of performing intersection testing in a ray tracing system, wherein intersection testing is performed for each of a plurality of rays against nodes of a hierarchical acceleration structure, wherein the intersection testing for each of the rays comprises:

in response to identifying, in a memory, an indication of a re-entry point associated with a ray identifier that is associated with the ray, fetching from the memory the indication of the re-entry point that is associated with the ray identifier, the re-entry point being a node of the hierarchical acceleration structure for which an intersection has been identified for a previously tested ray associated with the ray identifier; and performing intersection testing of the ray against a set of nodes of the hierarchical acceleration structure starting from the re-entry point.

There may be provided a ray tracing system configured to perform intersection testing for each of a plurality of rays against nodes of a hierarchical acceleration structure, the system comprising:

a memory configured to store one or more indications of re-entry points associated with ray identifiers; and processing logic configured to, for each of the rays:

in response to identifying, in the memory, an indication of a re-entry point associated with a ray identifier that is associated with the ray, fetching from the memory the indication of the re-entry point that is associated with the ray identifier, the re-entry point being a node of the hierarchical acceleration structure for which an intersection was identified for a previously tested ray associated with the ray identifier; and performing intersection testing of the ray against nodes of the hierarchical acceleration structure starting from the fetched re-entry point.

There may be provided computer readable code configured to cause any of the methods described herein to be performed when the code is run. There may be provided non-transitory computer readable storage medium having stored thereon computer readable instructions that, when executed at a computer system, cause the computer system to perform any of the methods described herein.

The above features may be combined as appropriate, as would be apparent to a skilled person, and may be combined with any of the aspects of the examples described herein.

BRIEF DESCRIPTION OF THE DRAWINGS

Examples will now be described in detail with reference to the accompanying drawings in which:

FIG. 9 shows a computer implemented method for converting ray data for a ray into a ray representative;

FIG. 10 shows a computer implemented method for converting a ray representative into ray data;

Figure 1:
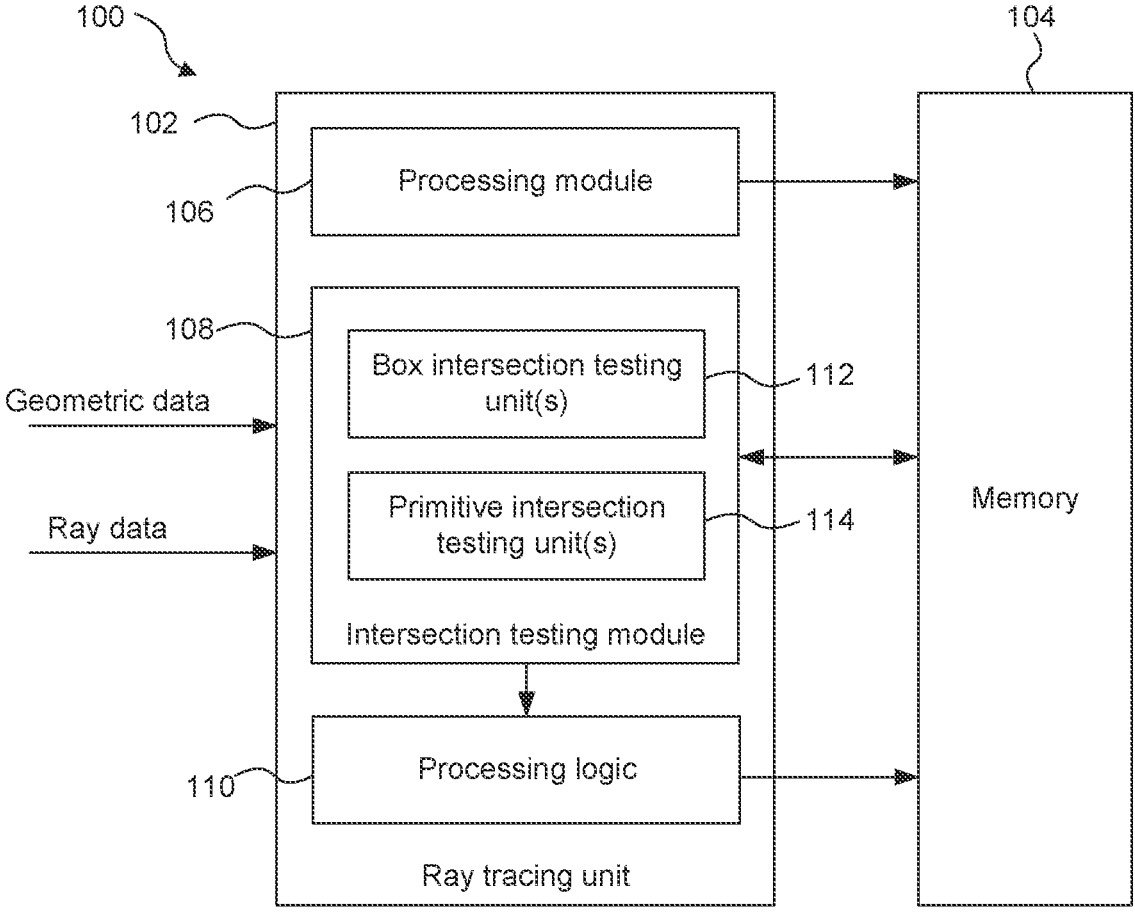
FIG. 1 shows a ray tracing system configured to perform intersection testing for each of a plurality of rays against nodes of a hierarchical acceleration structure.

The accompanying drawings illustrate various examples. The skilled person will appreciate that the illustrated element boundaries (e.g., boxes, groups of boxes, or other shapes) in the drawings represent one example of the boundaries. It may be that in some examples, one element may be designed as multiple elements or that multiple elements may be designed as one element. Common reference numerals are used throughout the figures, where appropriate, to indicate similar features.

DETAILED DESCRIPTION

FIG. 1 shows a ray tracing system 100 that is configured to perform intersection testing. The ray tracing system comprises a ray tracing unit 102 and a memory 104. The ray tracing unit 102 comprises a processing module 106, an intersection testing module 108 and processing logic 110. The intersection testing module 108 comprises one or more box intersection testing units 112, and one or more primitive intersection testing units 114. In operation the ray tracing unit 102 receives geometric data defining objects within the 3D scene. The processing module 106 is configured to generate an acceleration structure based on the geometric data, and to send the acceleration structure to the memory 104 for storage therein. After the acceleration structure has been stored in the memory 104, the intersection testing module 108 can retrieve nodes of the acceleration structure from the memory 104 to perform intersection testing of rays against the retrieved nodes. The results of the intersection testing are provided to the processing logic 110. The processing logic 110 is configured to process the results of the intersection testing to determine rendered values representing the image of the 3D scene. The rendered values determined by the processing logic 110 can be passed back to the memory 104 for storage therein to represent the image of the 3D scene.

Figure 2A:
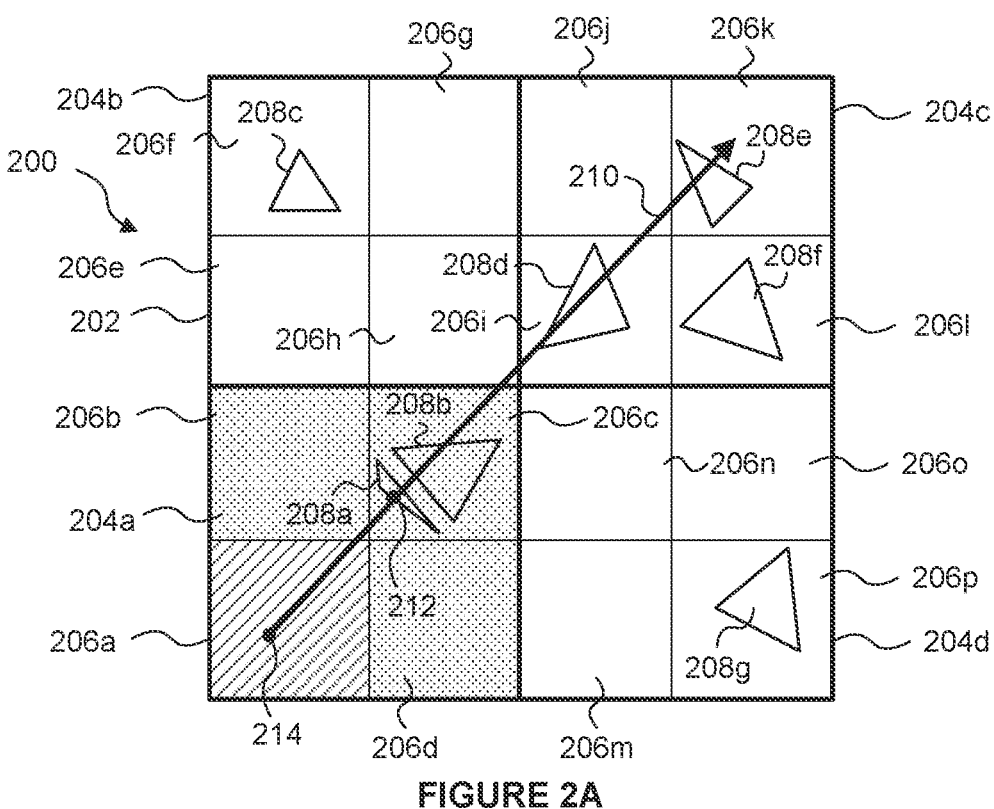
FIG. 2A shows an example of regions and primitives within a scene against which rays are to be tested for intersection.
Figure 2B:
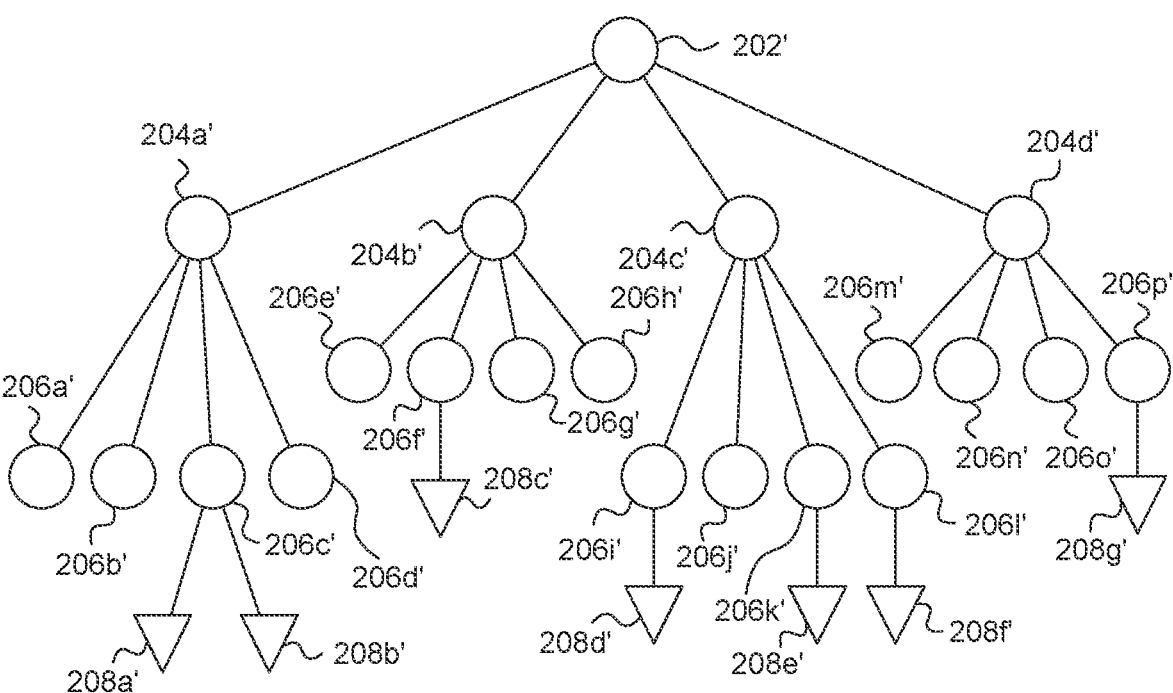
FIG. 2B shows a hierarchical acceleration structure used to represent the regions shown in FIG. 2A.

FIG. 2A illustrates a scene 200 to be rendered using a ray tracing approach. The scene may be rendered using an acceleration structure. The scene is illustrated in FIG. 2A as being a two-dimensional scene, for simplicity of explanation. However, it will be appreciated that a ray tracing approach is most usually used to render scenes with more than two dimensions, such as three-dimensional scenes, and the following description is applicable to three-dimensional scenes and accelerations structures also. FIG. 2B illustrates an acceleration structure used to represent the regions shown in FIG. 2A. The acceleration structure is hierarchal. This means that the acceleration structure comprises a plurality of layers (or "levels"). The acceleration structure may be arranged as a tree. The acceleration structure may therefore comprise one or more sub-trees, where each sub-tree is associated with a different node.

The scene 200 is divided into a number of regions. Each region of the scene may be an axis-aligned box that dissects the scene into a constituent component. In some examples, where the scene is a two-dimensional scene each region of the scene may be a quadrant of the scene. In examples where the scene is a three-dimensional scene, each region of the scene may be an octant of the scene. Each region of the scene covers a different area (or volume) of the scene. Each region of the scene may be further divided into sub-regions of the scene. Each sub-region of the scene may cover a non-overlapping portion of its region. Each region/sub-region of the scene may cover a different level of detail of the scene. A level of detail within the context of this application refers to a level in the acceleration structure hierarchy that is used to process the scene. That is, a node's level of detail relates to the number of steps between that node and the root node. Each size of region corresponds to a layer of the acceleration structure. For example, a first level of regions comprises first region 202. First region 202 is the only region in the first level, and covers the whole of the scene. The first region 202 may be represented by the root node 202' of the acceleration structure (shown in FIG. 2B). The root node 202' of the acceleration structure may be associated with a first level of detail for the scene. Where the scene in FIG. 2 is a two-dimensional scene, first region 202 may be further divided into four sub-regions, or quadrants, 204a, 204b, 204c, 204d. Sub-regions 204a, 204b, 204c, 204d may be associated with a second level of detail for the scene. The four sub-regions 204a, 204b, 204c, 204d of the scene 200 are represented by child nodes 204a', 204b', 204c', 204d' of the root node 202' (shown in FIG. 2B). An exemplary sub-region 204a of first region 202 is illustrated using dotted shading. The sub-regions 204a, 204b, 204c, 204d of the scene have a higher level of detail than the first region 202 represented by the root node. Thus, the sub-regions 204a, 204b, 204c, 204d are represented by sub-nodes 204a', 204b', 204c', 204d' of the acceleration structure at a second level of detail (as shown in FIG. 2B). Where the scene in FIG. 2A is a two-dimensional scene, each of the sub-regions 204a, 204b, 204c, 204d may be further divided into four sub-regions, or quadrants. For example, sub-region 204a may be further divided into sub-regions 206a, 206b, 206c, 206d. Sub-regions 206a, 206b, 206c, 206d may be associated with a third level of detail for the scene. The sub-regions 206a, 206b, 206c, 206d of the scene 200, for example, are represented by child nodes 206a', 206b', 206c', 206d' of the node 204a'. An exemplary sub-region 206a of sub-region 204a is illustrated using hatched shading. Sub-region 206a of the scene has a higher level of detail than the sub-regions 204a, 204b, 204c, 204d. Thus, the sub-regions 206a, 206b, 206c, 206d are represented by sub-nodes of the acceleration structure at a third level of detail. The scene illustrated in FIG. 2 is divided into three different levels of detail. Thus, the sub-regions 206a, 206b, 206c, 206d comprise the highest level of detail for the scene. The sub-region 206a may be associated with a leaf node of the acceleration structure.

The scene 200 further comprises of a number of primitives 208a-208g. The primitives are positioned within regions of the scene. A primitive is a unit of geometry in the system, and may for example be a convex polygon. In FIG. 2A each primitive 208a-208g is illustrated as a triangle. However, in alternative examples, a primitive may be another shape. Examples of shapes from which primitives may be formed are squares, rectangles, pentagons and hexagons. Some primitives might not be convex polygons, or even polygons. For example, a primitive could be a disc or some other surface or volume. The primitives shown in FIG. 2B are not actually part of the hierarchical acceleration structure, but they are shown to illustrate how the primitives relate to the nodes of the hierarchical acceleration structure. A node of the hierarchical acceleration structure represents a region of the scene to be rendered. The term "tree node" refers to a node which has pointers to other nodes in the hierarchical acceleration structure (i.e. a tree node has child nodes in the hierarchical acceleration structure). With reference to FIG. 2B, nodes 202' and 204a'-204d' are tree nodes of the hierarchical acceleration structure; nodes 206a'-206p' are leaf nodes of the hierarchical acceleration structure; and triangles 208a'-208g' are not nodes of the hierarchical acceleration structure, but are illustrated in FIG. 2B to indicate which leaf nodes have pointers to primitives. It is noted that, although the hierarchy illustrated in FIG. 2B comprises nodes that do not contain primitives (i.e., nodes 206a', 206b', 206d', 206e', 206g', 206h', 206j', 206m', 206n' and 2060'), in some examples these nodes are culled from the acceleration structure, or otherwise not constructed, during its build process as they do not have any geometry to be tested against rays. In the main examples described herein, a leaf node represents a region of the scene that may comprise one or more primitives and the leaf node includes a respective one or more pointers to those one or more primitives. In these examples the region represented by a leaf node may be an axis-aligned bounding box (e.g., the tightest conservative axis-aligned bounds) around the one or more primitives. However, in other examples, primitives may be considered part of the acceleration structure such that a leaf node is a primitive in the scene.

A ray (r) can be defined as $r=O+Dt$ where O is a vector which represents the ray origin, D is a vector which represents the ray direction and t represents a distance along the ray from the origin. An exemplary ray traversing the scene 200 is represented by reference numeral 210 in FIG. 2A. The ray 210 has an origin 214, which may or may not correspond with the origin of the scene. The ray 210 may have a defined extent within the scene. The ray 210 may intersect more than one of the primitives 208a-208g in the scene. So, following a primitive intersection stage, if an intersection is found between the ray and a primitive, an intersection selection stage determines whether the new intersection point or an old intersection point for the ray should be selected. Typically, the closer of the two intersections is selected (i.e. the first intersection that the ray "physically" encounters in the scene is selected). The term "closer" here may mean closer to the ray origin in implementations where the intersection distances can only be positive (i.e., intersection distances that extend in front of the ray origin). In implementations where intersection distances can be positive or negative (i.e., extending behind the ray origin), the term "closer" may mean closer to minus infinity. In some examples, a deterministic tie break may be used to establish which of the two intersections to select. It is noted that the "distance" of an intersection referenced herein is usually measured as a multiple of ray lengths, as opposed to being traditional geometric measurement. The 'ray length' may be given by the magnitude of the direction vector, D, of the ray. The selected intersection is then used for further processing of the ray, whilst the unselected intersection is discarded. This process is also known as hidden-surface determination, shown-surface determination, hidden-surface removal (HSR), occlusion culling (OC) or visible-surface determination (VSD). The current closest intersection point is a per-ray attribute and therefore may be stored as ray data. In some instances, the intersection determination may be based on whether the distance along the ray that the intersection occurs is between minimal and maximal culling distances (aka distance range, or culling interval) for the ray (which may be referred to as $t_{min}$ and $t_{max}$). Whilst the initial values of $t_{min}$ and $t_{max}$ are predetermined prior to intersection testing, their values may be dynamically varied from these initial values during intersection testing. For example, during intersection testing, $t_{max}$ and/or $t_{min}$ may be updated to a value that is equal to the distance between the ray origin and a determined intersection. An advantage of this approach is that the total number of distance values that are stored for a ray can be reduced during intersection testing. Consider, for example, that a ray is initially defined by its minimal and maximal culling distances $t_{min}$ and $t_{max}$. The intersection distance for the "closest" intersection point for a ray, as determined during intersection testing, may be defined as tint. As tint is the "closest" intersection distance that is less than or equal to $t_{max}$, the ray data for a ray may be edited during intersection testing to replace $t_{max}$ with tint, thereby shortening the valid distance range for the ray and allowing more intersections to be rejected such that traversal can be avoided for whole subtrees that fall outside of the shortened valid distance range for the ray. Furthermore, by replacing $t_{max}$ with tint the valid distance range for the ray can be defined by the two distance values $t_{min}$, tint, meaning that after a first intersection for a ray the value of $t_{max}$ is redundant and does not need to be stored.

Traditionally, intersection testing may be performed for a ray in a recursive manner using the acceleration structure by first testing the ray for intersection with the root node 202' of the acceleration structure. If the ray is found to intersect a parent node, testing can then proceed to the sub-nodes (or child nodes) of that parent. In contrast, if the ray is found not to intersect a parent node, intersection testing of the child nodes of that parent node can be avoided, saving computational effort. If a ray is found to intersect a leaf node then it can be tested against the objects within the region represented by the leaf node to thereby determine which object(s) the ray intersects with. For the exemplary ray 210 traversing the scene 200, intersection testing is first performed for the root node 202' of the acceleration structure which corresponds to the first region 202 of the scene. From this first intersection testing it is determined that the ray 210 intersects (or passes through) the first region 202. Thus, intersection testing must be performed at a more granular level of detail within the first region in order to determine whether there are any primitive intersections within the first region 202. Then, intersection testing is performed for child nodes 204a'-204d' of the root node (i.e., nodes corresponding to sub-regions 204a-204d). In FIG. 2A, the ray 210 intersects (or passes through) sub-regions 204a, 204b and 204c. The ray does not intersect sub-region 204d. Further intersection testing therefore is performed for the nodes corresponding to the regions within sub-regions 204a, 204b and 204c. For region 204a, for example, child nodes of node 204a' will be tested. As mentioned above, in some examples this subset of child nodes only includes sub-node 206c', corresponding to region 206c, as this is the only sub-node that comprises geometry for testing. In other examples, it will be determined from this testing that the ray intersects (or passes through) sub-regions 206a, 206b and 206c, but does not intersect sub-region 206d. Similarly, intersection testing will be performed for the subset of available child nodes of node 204b' and it may be determined from this testing that the ray intersects (or passes through) sub-regions 206h, but does not intersect sub-regions 206e, 206f or 206g. Similarly, intersection testing will be performed for the subset of available child nodes of node 204c' and it may be determined from this testing that the ray intersects (or passes through) sub-regions 206i, 206j and 206k, but does not intersect sub-region 206l. Intersection testing may then be performed to determine whether there are any primitive intersections in the regions corresponding to sub-nodes for which intersections have already been determined. When intersection testing is complete, it will reveal that the ray 210 intersects primitives 208a, 208b, 208d and 208e, with the intersection at primitive 208a being the closest intersection. The "closest" intersection, in this context, refers to the intersection with that has the smallest 't' value. In some implementations the value of t (in the ray equation r=O+Dt) may be constrained to be non-negative, such that the "closest" intersection refers to the intersection that is closest to the ray origin 214; whereas in some other implementations the value of t may be allowed to be negative, such that the "closest" intersection refers to the intersection that is nearest to minus infinity along the direction of the ray.

A disadvantage of performing intersection testing in a recursive manner as explained above is that it is computationally intensive. That is, for each ray that traverses the scene 200, each level of the acceleration structure must be tested in order to establish an eventual intersection point for the ray. That is, the ray 210 is first tested against the root node 202', corresponding to first region 202, and testing is then performed for each level of nodes in the acceleration structure until an intersection with a leaf node is found. In FIG. 2A, within the scene 202, the ray 210 has primitive intersections in sub-region 204a, at distances which are less far along the ray (i.e. at smaller t values) than the intersection of the ray 210 with the sub-regions 204b and 204c, and the ray 210 does not intersect the sub-region 204d. Thus, the testing of ray 210 against sub-nodes 204b', 204c' and 204d' can be considered to be redundant, as the testing against those sub-nodes will not ultimately reveal any primitive intersections for the ray 210 that are closer than the primitive intersections within the sub-region 204a. The computational intensity, and efficiency, of intersection testing systems could be improved by devising a method that reduces the number of intersection tests that need to be performed on nodes of the acceleration structure that will not yield intersection results at intersection distances that are less far along the ray than another intersection.

The above improvements may be achieved by the use of re-entry points for rays for which intersection testing is to be performed. A re-entry point may be described as a node of the hierarchical acceleration structure for which an intersection has been identified for a previously tested ray. In other words, a re-entry point indicates a node comprising a leaf node, or a primitive, that has intersected a previously tested ray. The re-entry point may be a leaf node of the acceleration structure. The re-entry point may be the root node of the acceleration structure. The re-entry point may be a tree node of the acceleration structure associated with a level of detail between that of the root node and that of the leaf nodes. A re-entry point that is selected for a ray to be tested against the acceleration structure may indicate a node containing a primitive that has been intersected by a previously tested ray. The previously tested ray may be a similar ray to the ray that is to be tested. More specifically, the ray data for the previously tested ray may be similar to the data of the incoming ray.

An advantage of the use of re-entry points is that, when a new ray is to be processed, intersection testing for this new ray can start in the acceleration structure from the re-entry point instead of starting from the root node. The likelihood of the new ray intersecting a primitive located within the re-entry point is high as, in order to be associated with the same re-entry point as a previous ray, the ray to be tested will be similar to the previous ray. In a preferred example the re-entry point for a new ray to be tested is not the root node. In this example, by using a re-entry point, the ray tracing system can perform preliminary intersection testing from a sub-node of the acceleration structure that is not the root node. The effect that this has on the efficiency of intersection testing for a ray differs in dependence on the type of ray that is to be tested. For occluding rays (for which the results of intersection testing only have to determine whether or not the ray intersects with any object in the scene, aka any-hit rays), the testing of all nodes outside of the sub-tree defined by the re-entry point can be avoided by finding an early intersection within the sub-tree defined by the re-entry point. For non-occluding rays (for which the results of intersection testing should determine the closest intersection between the ray and an object in the scene, aka closest-hit rays), the testing of some nodes outside of the sub-tree defined by the re-entry point can be avoided by finding early intersections in the sub-tree. A more detailed description of occluding and non-occluding rays is provided below. Thus, the use of re-entry points aims to find an intersection as quickly as possible, minimising the number of intersection tests that are performed and therefore computational intensity.

Figure 3:
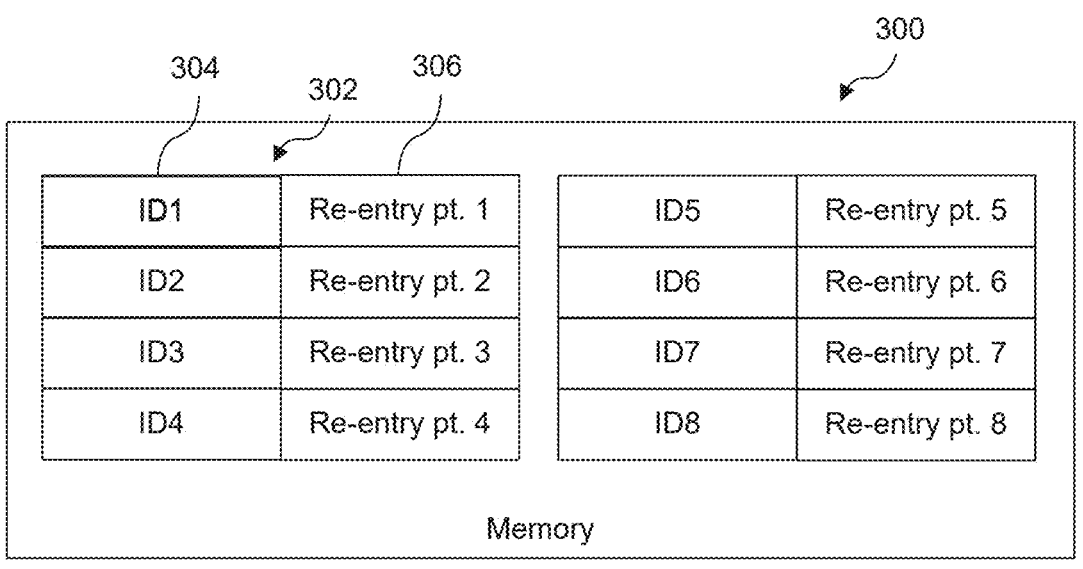
FIG. 3 shows the layout of a memory that may be used to store indications of re-entry points that may be used for intersection testing.

Indications of re-entry points to be used by the ray tracing system illustrated in FIG. 1 may be stored in a memory as illustrated in FIG. 3. The memory 300 of FIG. 3 may store indications of re-entry points that are accessed by the ray tracing system of FIG. 1 and used for intersection testing. The memory 300 is a storage device that stores data for immediate use in a computer or related computer hardware and digital electronic device. The memory 300 may be any type of storage device that is suitable for holding data to be accessed by the ray tracing system. The memory 300 may be a main memory. The memory 300 may form part of the main memory 104 illustrated in FIG. 1. The memory 300 may alternatively be a cache memory. The memory may be referred to as a likely hit cache, as the indications of re-entry points that it stores indicate likely hits between rays and nodes in the acceleration structure.

The difference between main memory and cache memory is that main memory is suited for storing data longer-term than the cache memory. An advantage to the memory 300 being cache memory is that cache memory is more suited to the updating and replacement of values stored in the memory with updated data. More specifically, where the memory 300 is a cache, new indications of re-entry points can be stored in the cache and can replace existing indications of re-entry points that are no longer required by the ray tracing system. A cache memory may also have finer addressing than a main memory, which means that smaller portions of data can be written to the cache in a single read/write request. Furthermore, a cache memory is configured to store data such that the ray tracing unit can retrieve that data from the memory rather than needing to retrieve that data directly from the main memory 102. An access to the cache is faster, i.e., lower latency, than a corresponding access to the main memory. This means that transactions, such as read or write transactions, on the cache can complete much faster than corresponding transactions on the main memory. This helps reduce delays in the system.

Where the memory is a cache, it may be a directly mapped cache. A directly mapped cache determines a cache line associated with an entry by using an index generated as a hashed result of an identifier for that entry as its address. A directly mapped cache comprises multiple sets (or columns) but only a single way (or row) of memory. If a line in a directly mapped cache is previously taken up by a memory entry when a new entry needs to be stored, the old entry is replaced to make room for the new one. An advantage of a directly mapped cache is that it allows for the fast access of data when compared to other types of cache. Alternatively, the cache may be an associative cache (also known as a fully-associative cache). In an associative cache, entries can be placed at any location in the cache memory. An associative cache comprises one set (or column) but multiple ways (or rows) of memory. An advantage of the memory 300 being an associative cache is that an associative cache offers a high level of flexibility for the purposes of mapping entries (i.e., minimising cache collisions), but at the expense of slower accesses when compared to other caches.

In a third example, the cache may be a set-associative cache. A set-associative cache is a hybrid form of directly mapped and associative caches, where the benefits/drawbacks of direct mapping and associativity are traded off. Set-associative caches group multiple cache lines together, creating a set of cache lines (aka a set of ways) that can be mapped to by multiple entries with the same index address generated as a hashed result of an identifier for that entry. A set-associative cache is advantageous as it offers a trade-off between the speed of access of a directly mapped cache and the flexible nature of an associative cache. Thus, a set-associative cache is faster to access than an associative cache and more flexible than a directly mapped cache. A set-associative cache may be referred to as an n-way set-associative cache. An n-way set-associative cache comprises multiple sets (or columns) of memory with n ways (or rows) per set.

In one example, the memory 300 is remote from the ray tracing unit 102 of FIG. 1. In an alternative example, the memory 300 is provided at the ray tracing unit. In a further example, the memory may be provided adjacent the ray tracing unit in a data path, so as to be between the ray tracing unit 102 and the memory 104. Data in the memory may be accessed, for example by the ray tracing unit, via a read transaction. Data can be written to the memory via a write transaction. For example, data can be written by the first processor to the first cache memory and/or to the main memory.

The memory 300 may comprise a plurality of memory cache lines. A representative memory cache line is denoted by reference numeral 302. In FIG. 3, the memory 300 comprises eight cache lines. In alternative examples the memory may comprise more or fewer memory cache lines. The memory cache lines provide separate storage regions in the cache. The separate memory cache lines within the memory 300 are separately addressable. The memory cache lines may otherwise be identical. Each memory cache line is suitable for storing data indicating a ray identifier 304 and an indication of a re-entry point 306 that is associated with that ray identifier. A ray identifier 304 for a ray may be the raw ray data for the ray, or may comprise a coarser representation than raw ray data. The ray identifier is described in further detail below. The ray identifier for a ray may generalise, quantise or compress, the ray data of the ray. In generalising the ray data, the same ray identifier may correspond to data for multiple rays that have similar data. An indication of a re-entry point may be an index to the re-entry point. An index to a re-entry point may otherwise be referred to as a reference, or pointer, to that re-entry point. Each indication of a re-entry point in the memory is stored alongside a corresponding ray identifier. Each indication of a re-entry point is associated with a corresponding ray identifier. A read request of the memory 300 may be performed using a ray identifier. More specifically, the memory 300 may be searched to determine whether an indication of the ray identifier comprised within the read request is present in the memory. If a ray identifier is present in the memory, then the indication of a re-entry point associated with that identifier can be retrieved from the memory. The indications of re-entry points can then be used by the ray tracing system 100.

Figure 4:
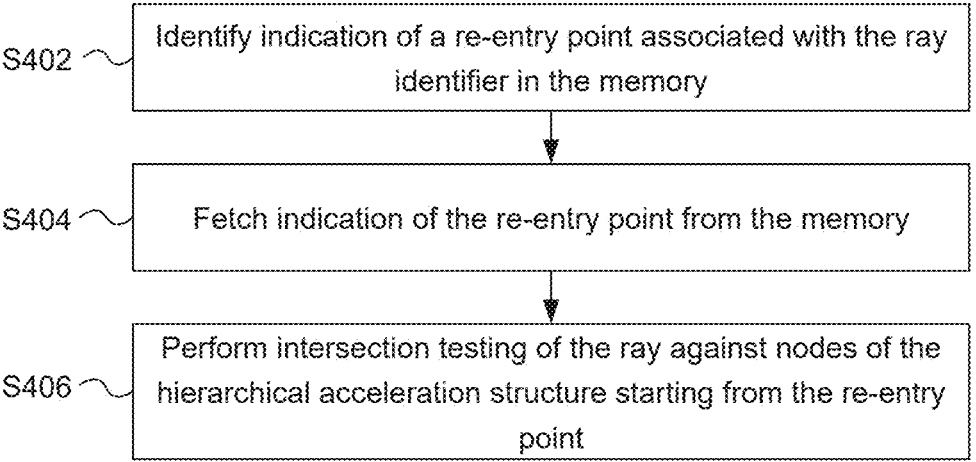
FIG. 4 shows a first example of a computer-implemented method of performing intersection testing in a ray tracing system.

A computer-implemented method of performing intersection testing in a ray tracing system, using indications of re-entry points stored in the memory 300 of FIG. 3, is illustrated in FIG. 4. The method may be performed by the ray tracing system 100 of FIG. 1. In a more specific example, the method may be performed by the intersection testing module 108 of the ray tracing system in FIG. 1. The intersection testing may be performed for each of a plurality of rays against nodes of a hierarchical acceleration structure. The intersection testing for each of the rays comprises at least three steps. The method is initiated when data for a new ray for which intersection testing is to be performed is received by the ray tracing system. When data for a new ray is received, a read request is sent to the memory. The read request may comprise a ray identifier associated with the new ray. The read request forms part of a read operation that is performed on the memory to determine whether there is an entry in the memory that corresponds to the new ray.

Each ray identifier in the memory 300 is stored alongside an indication of the corresponding re-entry point for that identifier. As mentioned above the same ray identifier may correspond to data for multiple rays that have similar data. In other words, rather than each ray having a unique ray identifier, there is a one-to-many relationship between the ray identifiers and the rays. If there is a ray identifier corresponding to the identifier for the new ray stored in the memory, then there is also an indication of a re-entry point associated with that identifier in the memory. In FIG. 4, a first step, S402 comprises identifying an indication of a re-entry point associated with a ray identifier that is associated with the new ray in the memory. In other words, if the results of the read operation on the memory reveal that a ray identifier corresponding to the identifier in the read request is present in the memory, then the re-entry point associated with that identifier is deemed to be associated with the new ray to be processed. If an indication of a re-entry point is identified, it is then read from the memory. That is, at step S404 the indication of the re-entry point is fetched from the memory. As has been mentioned above, the re-entry point is a node of the hierarchical acceleration structure for which an intersection has been identified for a previously tested ray associated with the ray identifier. Once the indication of the re-entry point has been fetched from the memory, then at S406 intersection testing of the ray against nodes of the hierarchical acceleration structure is performed using the re-entry point identified by that indication. More specifically, intersection testing of the ray is performed against nodes of the sub-tree of the acceleration structure starting from the re-entry point. In other words, the intersection testing of the ray is performed only against a set of nodes in the acceleration structure, where the set of nodes comprises the nodes of the sub-tree that starts from the re-entry point.

As mentioned above, a re-entry point can be used to identify a node (e.g., node 204a′ in FIG. 2B) within which there is likely to be an intersection for a ray for traversal of a hierarchy. Initial intersection testing can be performed starting at the re-entry point, avoiding nodes at lower levels of detail in the acceleration structure (e.g., the root node 202′ in FIG. 2B). The testing of other nodes at the same level of detail as the re-entry point (e.g., nodes 204b′-204d′ in FIG. 2B), as well as sub-trees from those other nodes (i.e. including nodes at higher levels of detail than the re-entry point, such as child nodes 206e′-206p′ in FIG. 2B), can also be avoided in targeted intersection testing. Thus, ray tracing systems using re-entry points will have a potential "head start" over systems that use traditional intersection testing. This method is particularly useful for intersection testing that is performed for occluding rays, because it can be used to quickly identify a single intersection for the ray within the scene, after which no further intersection testing needs to be performed. It is also beneficial for intersection testing that is performed for non-occluding rays that have one or more intersections inside a sub-tree of an acceleration structure. For these non-occluding rays, traversal times are reduced by performing targeted intersection testing within a sub-tree from a re-entry point (within which there is likely to be at least one intersection) instead of traversing the whole of the hierarchy. The reduction in traversal times for intersection testing of non-occluding rays is highly beneficial due to the high cost (in terms of box/primitive tests) of testing these rays. Thus, even a small reduction in the time taken to perform intersection testing on non-occluding rays may reap significant cost benefits. Intersection testing performed on an occluding ray just needs to determine whether or not the ray intersects with any object in the scene, but it does not need to identify which intersection is the closest intersection, unlike non-occluding rays. An example of an occluding ray is a shadow ray which is used to determine whether there is any occlusion between the ray origin and a light source. Thus, in order for intersection testing of an occluding ray to be completed, only a single intersection of that ray with a primitive is required. So, in the case of occluding rays, if an intersection is determined from targeted intersection testing of a ray using a re-entry point, no further intersection testing needs to be performed for that ray. That is, testing of all nodes outside the sub-tree defined by the re-entry point is avoided by finding an intersection in that sub-tree. Thus, the use of a re-entry point can greatly expedite the processing of that ray. For non-occluding rays, testing of some nodes outside the sub-tree defined by the re-entry point may be avoided by finding an early intersection in the sub-tree, as that will reduce the $t_{max}$ value sooner, and thus nodes outside the sub-tree and that are beyond that (reduced) $t_{max}$ value need not be tested (when, otherwise, they would have been tested).

Figure 5A:
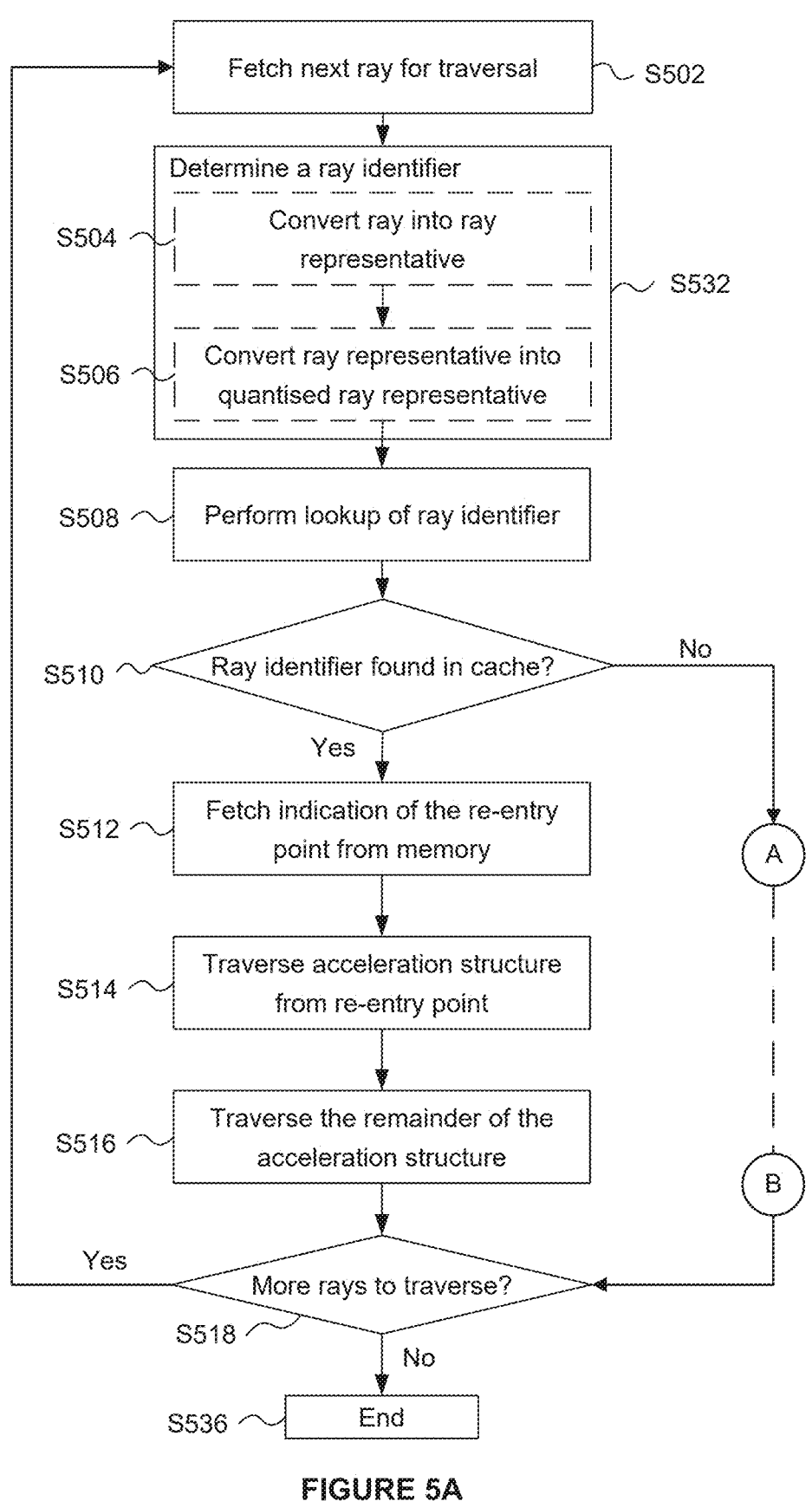
FIGS. 5A and 5B show a second example of a computer-implemented method of performing intersection testing in a ray tracing system.
Figure 5B:
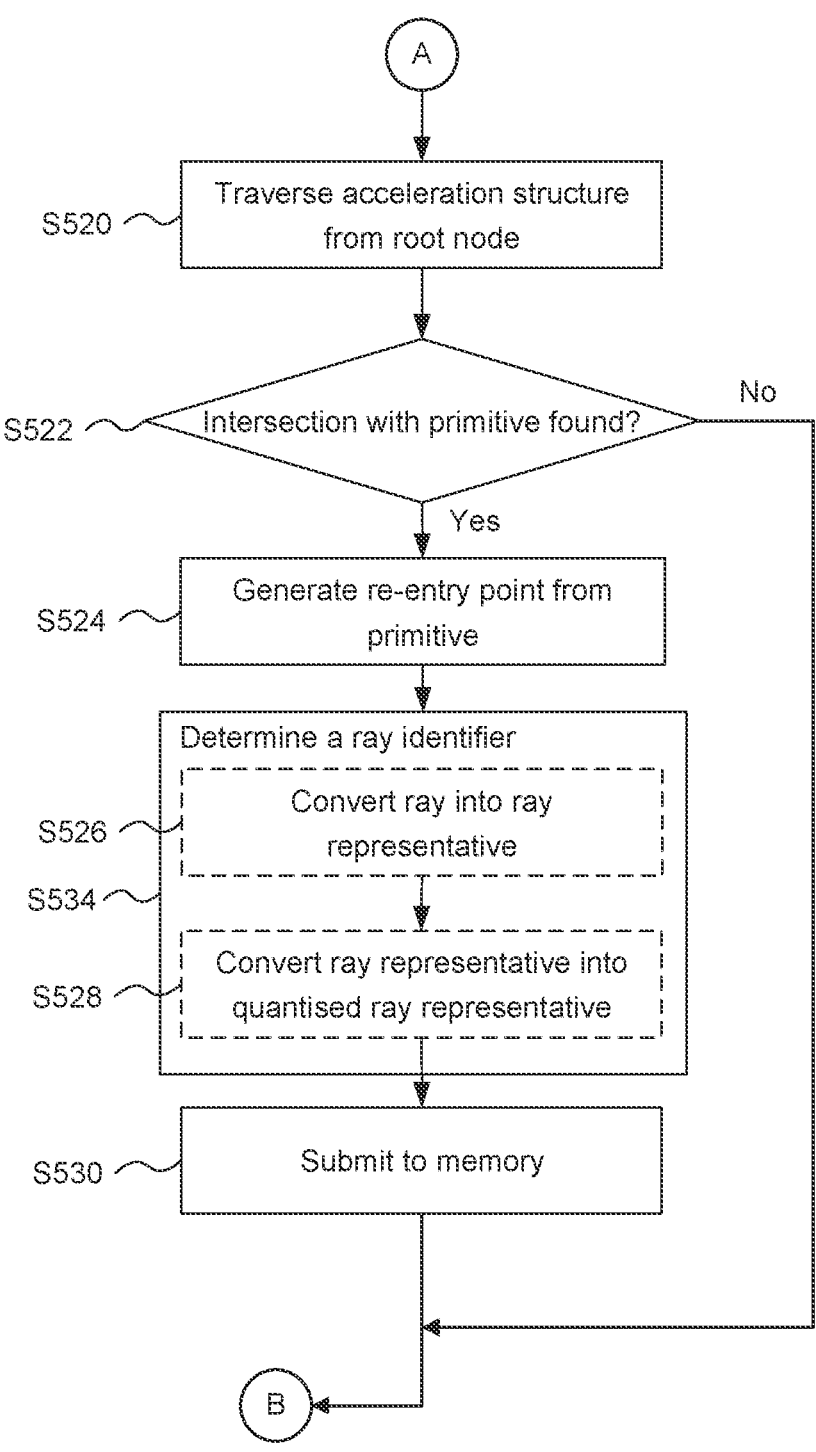

A second example of a computer-implemented method for performing intersection testing, using re-entry points, is illustrated in FIGS. 5A and 5B. The method of FIGS. 5A and 5B may be considered to be a more detailed example of the method illustrated in FIG. 4. As with the method illustrated in FIG. 4, the method of FIGS. 5A and 5B may be performed by the ray tracing system 100 of FIG. 1. In a more specific example, the method may be performed by the intersection testing module 114 of FIG. 1. The method of FIGS. 5A and 5B is performed when data for a new ray to be processed is received by the ray tracing system. When data for a new ray is received, the ray tracing system accesses the memory 300 to determine whether an indication of a re-entry point for the ray is present in the memory. More specifically, processing logic of the ray tracing unit may access the memory 300, using a ray identifier for the new ray, to determine whether an indication of a re-entry point corresponding to that ray identifier is present in the memory. The processing logic may correspond to logic 110 illustrated in FIG. 1. If a corresponding indication is identified in the memory, then the re-entry point corresponding to that indication is used as a starting point from which intersection testing for the new ray is performed.

The method of FIGS. 5A and 5B is initiated at step S502, at which a new ray for traversal is fetched by the ray tracing system 100. More specifically, the new ray may be fetched by the ray tracing unit 102. The ray may be fetched by the intersection testing module 108 of the ray tracing unit 102. The fetching of a new ray for traversal means that ray data for the new ray is received by the ray tracing system. The ray data defines the new ray to the processed. The new ray is to be tested against nodes of the hierarchal acceleration structure.

Once ray data of the new ray has been fetched, then at step S532 a ray identifier for the ray is determined. The ray identifier may be the same for multiple rays, which may also have similar data. More specifically, the ray identifier may identify a set of rays, each ray in the set of rays having a single indication of a re-entry point. The set of rays may be similar rays. The ray identifier may comprise a coarser (i.e., quantised) version of ray data than the raw ray data for the new ray, such that the ray identifier may be used to identify rays that are similar to the new ray. Step S532 may further comprise the optional steps of converting the ray into a ray representative (S504) and converting the ray representative into a quantised ray representative (S506). These steps are indicated as optional in FIG. 5A by their encapsulation in dashed lines. Steps S504 and S506 will be explained in further detail below.

At step S508 a stored ray is compared with a new ray. In this way, step S508 comprises performing a similarity check to determine whether the new ray is similar enough to a stored ray to warrant the new ray using the re-entry point corresponding to the stored ray. Step S508 may be implemented in different ways. In a first implementation (as shown in FIG. 5A), a lookup for a stored ray identifier is performed by the ray tracing system in step S508. The lookup for the stored ray identifier may be performed by the ray tracing unit 102. The lookup for the stored ray identifier is performed on the memory 300. In this step, a read operation is performed of the memory 300 using the ray identifier associated with the new ray to be processed. The ray identifier may be, or form part of, the ray data received at step S502. Alternatively the ray identifier may be generated in steps S504 and S506. Step S508 may determine whether a ray identifier (and therefore an indication of a re-entry point) corresponding to the new ray is stored in the memory. In the implementation of step S508 shown in FIG. 5A, the similarity check is performed by using first quantised ray data generated for the new ray (e.g., a quantised ray representative). This step may comprise performing an 'equals comparison', for each previously stored identifier (see discussion of step S530 below), to compare the first quantised ray data and the previously stored identifier as second quantised ray data. If the first quantised ray data and the second quantised ray data are identified as being the same, then the stored indication of a re-entry point associated with that stored identifier can be used for the new ray. Advantages of this implementation (compared to the alternative implementation mentioned below) are that it offers an implicit handling of similarity, more compact ray identifiers (and therefore reduced storage requirements) and no overlapping sets of data. In an alternative implementation, the similarity check of step S508 may be performed using ray data (e.g., raw ray data, a ray representative, or a quantised ray representative) for two rays (a stored ray and a new ray), e.g., by comparing a distance metric between the two ray data, defining the two rays, to a threshold. If the difference metric between the ray data is (either strictly or non-strictly) below the threshold value, then this indicates that the two rays are 'similar' and the stored re-entry point can be used for the new ray. If the difference metric between the two ray data is (either non-strictly or strictly) above the threshold value, then this indicates that the two rays are not 'similar' and the stored re-entry point is not to be used for the new ray. The 'difference metric' may be any suitable indication of the similarity (or difference) between the two sets of ray data defining the two rays, e.g., based on differences between their origin vectors and/or differences between their direction vectors. The threshold value may be a strictly positive value.

At step S510, it is established whether a ray identifier corresponding to the ray data of the next ray for traversal is stored in the memory. If the answer is yes, then an indication of the re-entry point associated with the ray identifier is found in the memory. This may correspond to step S402 of FIG. 4. If an indication of the re-entry point is found in the memory, then the method proceeds to step S512 of FIG. 5A. If the answer to the question at step S510 is no, then an indication of a re-entry point associated with the ray identifier is not present in the memory. In this case, the method proceeds to step S520 of FIG. 5B, which is described in further detail below.

At step S512, where it is established that a ray identifier for the new ray for traversal is stored in the memory, the indication of the re-entry point that is stored alongside that ray identifier is fetched from the memory. The fetching of the indication in step S512 may correspond to step S404 in FIG. 4. As mentioned above, the re-entry point is a node of the hierarchal acceleration structure for which an intersection has been identified for a previously tested ray associated with the ray identifier. In other words, the re-entry point is a point in the acceleration structure associated with a region of the scene for which intersection testing of the ray is to be performed. The indication of the re-entry point may be an identifier for the node. That is, the indication of the re-entry point may comprise data identifying the node within the acceleration structure that corresponds to that point.

At step S514, intersection testing is performed for the new ray by traversing the ray through the acceleration structure from the re-entry point that has been fetched from the memory. In other words, the new ray is traversed through the acceleration structure using the re-entry point corresponding to the fetched indication as a starting point. The re-entry point is a node in the acceleration structure. Thus, the traversal of the acceleration structure is performed for the sub-tree associated with the node of the re-entry point. The sub-tree associated with the node of the re-entry point is the sub-tree in the hierarchy that has the node of the re-entry point as its root node. The sub-tree associated with the node of the re-entry point may be defined as a set of nodes. In other words, the ray is traversed through the acceleration structure through each of the sub-nodes of the set of nodes defined by the re-entry point, down to the primitives of the re-entry point (assuming a primitive intersection is found, otherwise the ray is traversed as far as necessary through the sub-nodes of the re-entry point to determine that no primitive intersection occurs). The purpose of performing ray traversal in this way is the chance to determine at least one primitive, within the node of the re-entry point, that intersects the ray. Step S514 is completed once the ray has fully traversed the sub-tree of the re-entry point. Step S514 may correspond to S406 in FIG. 4. It will be appreciated that the phrase 'fully traversed' does not necessarily refer to scenarios where every node of a tree or sub-tree has been tested, but rather indicates that the tree/sub-tree is traversed to a point where either: (a) it is known that the ray does not intersect a primitive within the sub-tree, (b) a single hit has been identified (for an occluding ray), or (c) it is known that the closest intersection of the ray with a primitive within the sub-tree has been identified (for a non-occluding ray). During intersection testing of a ray against a node or against a primitive, if there is an intersection at a point on the ray with a t value of tint, the minimum culling distance $t_{min}$ is used so that the intersection is not accepted if $t_{int}<t_{min}$ (or if $t_{int}\leq t_{min}$ in alternative examples), and the maximum culling distance $t_{max}$ is used so that the intersection is not accepted if $t_{int}>t_{max}$ (or if $t_{int}\geq t_{max}$ in alternative examples). Once S514 is complete, and an intersection has been accepted at an intersection point having a t value of tint, then the value of $t_{max}$ for the ray may be trimmed (i.e. reduced) so that it corresponds to the identified intersection (i.e. $t_{max}$ is set to be equal to $t_{int}$). Subsequent intersection testing does not need to be performed for points on the ray with t values greater than $t_{max}$. The use of the re-entry point means that an intersection in the sub-tree of the re-entry point is found early on during intersection testing, and an early reduction in $t_{max}$ can lead to fewer intersection tests needing to be performed, thereby reducing the complexity, latency and power consumption of performing intersection testing, e.g. for non-occluding rays.

The results of intersection testing at step S514 may reveal one intersection (e.g., for an occluding ray), no intersections, or a plurality of intersections of the ray with the node of the re-entry point (for non-occluding rays only). The results of intersection testing may be stored by the ray tracing system and may be used for the subsequent performance of processing operations on the scene. An example of a subsequent processing operation that may be performed on the scene is a shader operation. The results of intersection testing performed at step S514 may also be used to trim the maximum distance $t_{max}$ of the ray so that, conceptually, the ray does not extend to values oft greater than $t_{max}$, where $t_{max}$ represents the value of t for the ray at the closest identified intersection.

In some examples, after step S514, no further intersection testing of the ray is performed. That is, for some rays, intersection testing may be deemed complete once a single intersection has been identified. An example of a ray for which intersection testing is deemed complete after a single intersection is identified is an occluding ray. However, in most ray tracing operations it is necessary to consider multiple intersections between a ray and the scene to be processed. This is because, for non-occluding rays, it is the closest intersection of the ray with the scene that is sought. It can't be guaranteed, for these rays, that an intersection that is identified from intersection testing that starts from the re-entry point is the closest intersection. Thus, in order to definitively determine the closest intersection, a wider portion of the acceleration structure must also be traversed by the ray. This is done at step S516.

At step S516 the remainder of the acceleration structure is traversed. In other words, at step S516 intersection testing of the ray is performed against nodes of the hierarchical acceleration structure that have not been tested by the intersection testing that starts from the re-entry point. The remainder of the acceleration structure may be traversed starting from the root node. The term "remainder of the acceleration structure" refers to the remaining nodes that are not included in the sub-tree associated with the node of the re-entry point (i.e., its complement). In other words, the sub-tree that includes the re-entry point is skipped, and so not traversed, during step S516. This is because the sub-tree having the re-entry point as its root has already been traversed at step S514. In some examples, indications of the intermediate nodes that lead from the root node of the hierarchy to the re-entry point may be derived from the indication of the re-entry point stored in the memory. If the originating node of the sub-tree comprising the re-entry point is identified by reference A, and the root node is identified by reference R, then the intermediate nodes may be considered to be nodes A_1, A_2, . . . A_i that lead from the root node R to the re-entry point A. If the ray is determined to intersect node A, then by extension it must also intersect nodes R, A_1, A_2, . . . A_i. If indications of nodes R, A_1, A_2, . . . A_i, can be derived from the re-entry point, then testing of these intermediate nodes may also be skipped at step S516. The intersection testing at step S516 comprises testing the ray against nodes of the hierarchical acceleration structure that are not in the set of nodes that are defined by the re-entry point. The root node corresponds to a region of the scene that covers the whole scene (see 202 in FIG. 2). Thus traversing the acceleration structure starting from the root node means that the whole of the scene has been considered at the end of the subsequent intersection testing in step S516. It is mentioned above that if, during intersection testing at step S514, one or more intersections between a node and the ray are identified, then the maximum distance of the ray ($t_{max}$) may be trimmed (i.e. reduced). This reduction in $t_{max}$ limits the distance range for the ray during the intersection testing performed in step S516. It means that the closest intersection for the ray is determined to be located no further from the origin than $t_{max}$. This means that nodes corresponding to regions of the scene that are further away from the origin (or more generally further from minus infinity if it is allowed to be negative) than $t_{max}$ do not have to be tested at step S516. Thus, when the remainder of the acceleration structure is tested at S516, efficiencies in intersection testing may be achieved by avoiding the need for testing nodes that correspond to regions of the scene that are further from the origin than the closest intersection identified using the re-entry point.

In FIG. 5A, steps S516 and S514 are performed sequentially. That is, step S516 is performed after step S514. So, in FIG. 5A the acceleration structure is traversed for a ray from the re-entry point of that ray, and then subsequently the acceleration structure is traversed for the remainder of the acceleration structure that does not include the sub-tree which descends from the re-entry point. Thus, the further intersection testing of S516 may be performed after the intersection testing of the ray against the nodes of the acceleration structure starting from the re-entry point corresponding to a fetched indication of a re-entry point. An advantage of this approach is that if there is an intersection within the node of the re-entry point, it will be identified before subsequent testing takes place in step S516. So, $t_{max}$ can be trimmed after targeted intersection testing but before subsequent intersection testing (i.e., testing of the remainder of the acceleration structure), which can be expedited by avoiding nodes corresponding to regions of the scene for which intersections may occur at points on the ray with t values greater than $t_{max}$. Another advantage is that, computational power can be reduced by performing intersection testing operations consecutively. In an alternative example, steps S516 and S514 may be performed in parallel. That is, the intersection testing of the remainder of the acceleration structure may be performed concurrently with the intersection testing of the ray against the set of nodes of the acceleration structure starting from the re-entry point. An advantage of this approach is that it decreases the total amount of time to perform intersection testing for each of the rays. That is, if steps S514 and S516 are performed at the same time, the total amount of time to complete these steps is reduced. Moreover, in the parallel approach, it is still likely that any intersection in the sub-tree from the re-entry point will be determined more quickly than in a conventional approach (i.e. without using a re-entry point at all), and that determination can still be used to trim $t_{max}$ and thus expedite the traversal of the remainder of the acceleration structure by avoiding the need to test nodes that would have otherwise been tested in the absence of the earlier intersection determination (although perhaps fewer unnecessary tests will be avoided than in the consecutive approach). For example, even in an implementation in which steps S514 and S516 are performed in parallel, the testing of the sub-tree descending from the re-entry point is likely to start (in step S514) before the parent node of the re-entry point is tested as part of step S516. Steps S514 and S516 may be executed with multiple instructions (e.g., volumes/primitives tests), and/or multiple data (e.g., rays), i.e., SISD, MISD, SIMD or MIMD. If multiple rays are in flight at once, a ray may not benefit from re-entry point data generated from other rays traversing concurrently in step S514, e.g., being tested against primitives in parallel. Other forms of parallelism may also reduce the overall benefits.

At step S518, it is determined whether there are further rays for which intersection testing is to be performed. That is, it is determined whether there are more rays to traverse the acceleration structure. In other words, it is determined whether there are any rays with data that is to be fetched by the ray tracing system. If there are further rays to be fetched by the ray tracing unit, then the method returns to step S502 where the next ray for traversal is fetched. The next ray is associated with a ray identifier, similarly to the new ray described above. Steps S502-S516 are then performed for the next ray. If there are no further rays to traverse the acceleration structure, then at step S536 the method ends.

As described above, a ray identifier for a ray is an identifier comprising data that (uniquely or non-uniquely) represents the ray. In one example, the ray identifier may correspond exactly to the raw ray data for the ray. In an alternative example, the ray identifier may not correspond exactly to raw ray data. The ray identifier may comprise a coarser representation of the ray than the raw ray data (e.g. a quantized representation of the ray). In comprising a coarser representation of the ray than the raw data, the ray identifier may not uniquely identify the ray. However, the ray identifier may nevertheless represent the ray by defining a set, or "bucket", of raw data values for raw ray data. The ray identifier may generalise, quantise or compress, the ray data. The same ray identifier may correspond to data for multiple rays that have similar data. The ray identifier may also be referred to as a ray bucket identifier, as it may identify a set, or "bucket" of rays that are similar. The ray identifier may alternatively be referred to as a ray representative, or a quantised ray representative when the ray data is quantised.

The ray identifier may be a fixed bit-width value based on position and direction data for the ray. In other words, the ray identifier may be a data packet comprising a fixed number of bits. Each ray identifier may comprise the same number of bits. An advantage of each of the ray identifiers comprising the same number of bits is that the identifiers can be stored in identical cache lines of the memory 300. The ray identifier may comprise fewer bits than the raw ray data. The ray identifier may comprise 18 bits. The ray identifier may comprise any alternative number of bits. An advantage of the ray identifiers having a low bit width is that this conserves storage resources in the memory 300. The number of bits of the ray identifiers should be selected so as to conserve space in the memory whilst also ensuring that they are sufficiently representative of the rays that they identify. The number of bits for the ray identifiers should ideally be selected to ensure that each ray identifier sufficiently represents the group of rays that it both identifies and distinguishes from other groups of rays, but also that there are not too many duplicate indications of re-entry points being stored in the memory (i.e. where an indication of the same re-entry point is stored for different ray identifiers). In order to keep the number of duplicate indications of re-entry points that are stored in the memory low (thereby keeping the amount of data stored in the memory low), it is expected that the ray identifiers will comprise fewer bits than the raw ray data that they represent.

If, at step S510, it is established that a ray identifier corresponding to the ray data of the next ray for traversal is not stored in the memory, then the method of 5A proceeds to that of FIG. 5B. If there is not a ray identifier corresponding to ray data stored in the memory, then it is established that there is not a ray identifier corresponding to the new ray to be tested stored in the memory. Thus, there is not an indication of a re-entry point for the new ray stored in the memory. This means that targeted intersection testing, starting from a re-entry point, cannot be performed for the new ray.

At step S520, the ray tracing unit is used to traverse the ray through the acceleration structure from the root node. That is, the ray is traversed from the node corresponding to a region that covers the whole of the scene (see 202 in FIG. 2). The traversal of a ray through an acceleration structure starting from the root node, as described above, is acknowledged as a traditional method of performing intersection testing. Traversal of the ray starting from the root node is performed if there is not an indication of a re-entry point stored for the ray, because there is no re-entry point data for the ray to provide a "potential head start" as to where an intersection for the ray may be present in the scene. Traversal of the ray through the scene starts at the root node and, if an intersection is detected, the testing continues down through one or more sub-trees that branch off of the root node until it has been performed for the primitives of the acceleration structure.

At step S522 it is determined whether the ray has intersected a primitive in the scene. More specifically, it is determined whether an intersection between a ray and a primitive has been detected. If an intersection with a primitive has not been detected, then no further processing of the ray needs to be performed. If the ray has not intersected a primitive, then a re-entry point cannot be generated for the ray. Thus, the method proceeds to step S518, as summarised above, where it is established if there are any further rays for the ray tracing system to test.

If it is determined that the ray does intersect with a primitive in the scene, then at step S524 a re-entry point is generated for the ray. The re-entry point is a node that is intersected by the ray. The re-entry point for a ray point therefore corresponds to a region of the scene within which an intersection between a primitive and the ray is identified. The re-entry point may be a node located at any suitable level of detail in the acceleration structure. Thus, the re-entry point may be associated with any size of region in the scene.

The size of the region, or level of detail of the node, for the re-entry point may be pre-determined, as explained in further detail below. Alternatively, the level of detail of the node for the re-entry point may be determined dynamically during intersection testing. The 'level of detail' of a node indicates the level of the node within the acceleration structure, e.g. relative to the root node of the acceleration structure.

After step S524, at step S534 a ray identifier for the new ray is determined. As with the ray identifier generated at step S532, the ray identifier generated at step S534 may comprise a-coarser version of ray data than the raw ray data for the new ray, such that the ray identifier may be used in the future to identify rays that are similar to the new ray. Step S534 may further comprise optional steps S526 and S528 which will be described in further detail below. At step S530, once the re-entry point has been generated, an indication of (e.g., pointer to) the re-entry point may be generated and submitted to the memory 300. Thus, an indication of the re-entry point may be stored in the memory. As mentioned above, the memory 300 may be a cache. The indication of the re-entry point is stored alongside the ray identifier for the ray for which the re-entry point has been generated. The indication of the re-entry point, once stored in the memory, can be accessed by the ray tracing system when subsequent rays are to be processed. More specifically, rays with similar position and direction data to the ray for which the re-entry point is stored may access the memory using the same ray identifier as the identifier for that ray.

At steps S522 and S524, intersection testing is performed for the ray and a re-entry point for the ray is generated. The re-entry point is generated using an identified primitive intersection for the ray. An indication of the re-entry point, together with the ray identifier, is then stored in the memory. In the example illustrated in FIG. 5B an indication of the re-entry point is stored in the memory for a ray that does not already have a stored re-entry point. In an alternative example, a ray may already have an indication of a re-entry point stored in the memory. However, it may be useful for the most recent, or the closest, indication of a re-entry point to be stored in the memory. Thus, the indication of the new re-entry point may replace the indication of the old re-entry point in the memory. That is, the indication of the old re-entry point may be discarded in favour of the indication of the new re-entry point. Another example of an instance where a new indication of the re-entry point replaces an old indication of the re-entry point in the memory may occur when, at step S516 in FIG. 5A, an intersection is identified from traversal of the remainder of the acceleration structure as being the closest intersection. Alternatively, the replacement may occur when any new intersection is identified (this alternative may be specific to occluding rays as, for these rays, the "closest" intersection does not need to be identified). In this instance, steps S522 to S530 may be performed for the re-entry point corresponding to the intersection identified at step S516. Alternatively to the discarding of the old re-entry point, the indication of the new re-entry point may be stored alongside the indication(s) of the old re-entry point(s), assuming that these are distinct. For example, a re-entry point may be stored in the memory for each primitive intersection that is identified in steps S514, S516 or S520, irrespective of whether or not that intersection is the closest intersection. Where multiple re-entry points are stored for the same ray identifier, then in subsequent intersection testing either (a) one of the re-entry points is selected as a starting point (e.g., based on the re-entry point, possibly out of those re-entry points whose intersection distance is within the distance range of the ray only, that has the "closest" intersection distance with respect to the direction of the ray), or (b) each re-entry point is selected as a starting point, such that there are multiple distinct starting points (i.e. multiple steps similar to step S514 in which traversal is performed for a sub-tree having a respective re-entry point as a root within the acceleration structure). For option (a), this may involve storing an indication of the intersection distance alongside each indication of a re-entry point in the memory. These indications can be compared to the distance range and direction of a new ray, at lookup step S508, to skip any re-entry points that are outside of the distance range of the new ray. For option (b) intersection testing may be performed from the multiple re-entry points either sequentially or in parallel. The "remainder" of the hierarchy to be traversed, after traversal from the multiple re-entry points, may be the remaining nodes of the hierarchy that are not included within any of the sub-trees of each of the re-entry points. In a further example, where rays are generally coherent (e.g., having a similar direction), the indication of the new re-entry point may be discarded in favour of the indication of the existing re-entry point, with the indication of the old re-entry point remaining stored in the memory. In this example, the indication of the new re-entry point may correspond to an intersection that is "farther", with respect to the direction of the current ray, from the origin of the ray than the intersection corresponding to the old re-entry point. This example may comprise storing, in addition to the indication of the re-entry points and the ray identifiers, an indication of the primitive intersection distance for each re-entry point.

The methods of FIGS. 4, 5A and 5B enable the generation, storage and use of re-entry points to expedite the intersection testing for rays in an acceleration structure. An advantage of using re-entry points to perform intersection testing, in order to render an image of a scene, can be seen in FIG. 2A. Imagine, for ray 210 in FIG. 2A, that the memory 300 stores the identifier for that ray alongside an indication of the re-entry point corresponding to sub-region 204a of the scene. That is, the re-entry point for the ray identifier for ray 210 will be node 204a'. When ray data for ray 210 is received by the ray tracing system, a read operation of the memory is performed using the identifier for ray 210. The ray identifier for ray 210 is identified in the memory, and the indication of the re-entry point is fetched from the memory, and is used to indicate the corresponding re-entry point, i.e., the node 204a', associated with the spatial region (e.g., area, volume) 204a. In the example of FIG. 2A, targeted intersection testing is performed within the sub-tree starting from the node 204a'. The sub-tree starting from node 204a' comprises the child nodes 206a'-206d' of node 204a'. Initial intersection testing does not have to be performed for nodes that do not originate from node 204a'. That is, targeted intersection testing does not have to be performed for any of the nodes in the sub-trees originating from nodes 204b'-d' in step S514. By performing intersection testing starting from region 204a, the ray is determined to intersect the node 204a' and also sub-nodes 206a', 206b' and 206c'. The ray is then determined to intersect primitives 208a and 208b in sub-node 206c'. The closest determined intersection for the ray, using the re-entry point, is the intersection with primitive 208a. The determination of an intersection of the ray with primitives 208a and 208b reduces the value of $t_{max}$ so that its value is equal to the value oft on the ray where it intersects the front edge of primitive 208a, as illustrated by reference numeral 212. If the ray is an occluding ray, then no further intersection testing is performed. If the ray is not an occluding ray, then further intersection testing for the ray should be performed, e.g. after testing from the re-entry point is complete (e.g., from the root node). As the value of $t_{max}$ has been reduced, subsequent intersection testing for the ray, after step S514 has completed, does not have to be performed for nodes corresponding to regions of the scene that extend beyond $t_{max}$. Thus, in this example, subsequent intersection testing that starts from the root node 202' can be avoided for sub-nodes of 204b'-d'. In particular, if $t_{max}$ is reduced to be equal to the t value on the ray 210 at the intersection with primitive 208a (i.e. at point 212) before the testing of the ray against nodes 204b', 204c' and 204d' is performed then the ray will not be found to intersect nodes 204b', 204c' or 204d', and no intersection tests then are performed for the ray 210 in respect of the sub-regions 206e'-206p' or in respect of the primitives 208c'-208g'. By finding a close intersection point early, using a re-entry point, the number of tests required to find the closest possible intersection for a ray is significantly reduced. In practice, the number of intersection tests that has to be performed per ray may be reduced by between 10-15%. Equivalently, the number of rays able to be processed per unit time may be increased by between 10-15%.

The re-entry point for a ray may be the root node of the acceleration structure. However, preferably the re-entry point is not the root node of the acceleration structure. In other words, the re-entry point for a ray is preferably a node other than the root node of the hierarchical acceleration structure (i.e., at least one level of detail higher than the root node). The reason for this is that intersection tests can be skipped if some of the nodes in the acceleration structure can be avoided. If the root node is the re-entry point, then intersection testing from the re-entry point may be performed for the entire acceleration structure (i.e., all of the sub-trees that originate from the root node). If the re-entry point is not the root node, then the traversal of the acceleration structure from the re-entry point excludes lower levels of detail in the hierarchy (such as the root node), which improves processing speeds.

It has been mentioned above that the re-entry point for a ray is a node of the hierarchical acceleration structure for which an intersection has been identified for a previously tested ray. In other words, a re-entry point indicates a node containing a primitive that intersects a previously tested ray. Whilst the re-entry point may be a leaf node (i.e., a node with a pointer to a primitive or a primitive itself) of the acceleration structure, it is preferred that the re-entry point is a tree node that is at least one level of detail lower than the leaf node. The re-entry point is determined from an intersection between a ray and a primitive.

Each level of detail in an acceleration structure may be associated with an integer N. Within the context of this application, N is an absolute value that defines the number of steps between the root node and a sub-node in the acceleration structure. N may increase as the levels of the hierarchy progress further from the root node. In other words, N may increase as the level of detail of the level in the acceleration structure increases. For example, N for the root node may be 0. N for the child nodes that extend from the root node may be 1. The total number of levels in the hierarchy may vary in dependence on the level of complexity of the hierarchy. The re-entry points may be nodes that are each at the same level of the hierarchy in the acceleration structure. In other words, each re-entry point that is generated for an acceleration structure may be at the same level of detail in the acceleration structure. The level of detail of the re-entry points may be fixed in the acceleration structure.

Where the level of detail of re-entry points is fixed, the indications of the re-entry point may be compressed (e.g., by deleting the least significant bits of the indications) when they are stored. This is useful when some bits are only used to distinguish between nodes at higher level of details than the level of detail of the re-entry point.

Two approaches have been devised to determine a fixed level of detail for re-entry points in an acceleration structure. These approaches are described below. It would be appreciated that, although two approaches are described below, other feasible approaches are possible. The first approach is referred to as a top-down approach. In this approach, the re-entry points have a level of detail that is M steps larger than the level of detail of a root node of the acceleration structure (i.e., where N for the root node is 0, M=N). A step larger means a higher level of detail. For example, the re-entry points may have a level of detail that is two steps larger than the level of detail of the root node. This means that, for each ray intersection that is determined by the ray tracing system, the re-entry point for that ray will be the node comprising the intersection that has a level of detail that is two steps larger than the level of detail of the root node. Where the root node has a level of detail of zero, the level of detail of the re-entry point will be two. The re-entry point may alternatively be clamped to the level of detail that is zero or one level of detail lower than the level of detail of a leaf node, if this level of detail is lower than the calculated level of detail that is M steps larger than the level of detail of the root node.

The second approach for determining the level of detail for re-entry points is referred to as a bottom-up approach. In this approach, the re-entry points have a level of detail that is L steps smaller than the level of detail of a primitive in the acceleration structure that was intersected by the previously tested ray associated with the ray identifier. For example, the re-entry points may have a level of detail that is two steps smaller than the level of detail of the intersected primitive. This means that, for each ray intersection that is determined by the ray tracing system, the re-entry point for that ray will be the node comprising the intersection that has a level of detail that is two steps smaller than the level of detail of the intersected primitive. A smaller step means a lower level of detail. If the primitive has a level of detail of four, then the level of detail of the re-entry point will be two. The re-entry point may alternatively be clamped to the level of detail that is zero or one level of detail higher than the level of detail of the root node, if this level of detail is higher than the calculated level of detail that is L steps smaller than the level of detail of a primitive.

Re-entry points may be pre-determined, or "pre-baked" onto triangle primitives during the build process for the acceleration structure. The pre-baking of re-entry points involves a trade-off between hierarchy build time/costs and traversal time/costs. The top-down approach suits a top-down build of the acceleration structure. The bottom-up approach suits a bottom-up build of the acceleration structure. Both approaches may be achieved by a streaming build. This means that a build processes each node only once before it is flushed downstream. Re-entry points may alternatively be determined dynamically during intersection testing. The dynamic determination of re-entry points may be combined with the top-down approach described above. It can be done by noting that a ray generally traverses a hierarchy top down. A reference to the latest non-primitive node that the ray is tested against for intersection can be stored until the required level of detail is reached. Once the required level of detail is reached, the re-entry point is no longer updated.

For dynamic determination of re-entry points the memory 300 may store, for a current level of detail, a current indication of the success record of a ray, out of those rays who find a stored ray identifier in the cache, at finding any intersection in the sub-tree of the re-entry point node determined by that current level of detail. The indication of the success record may be weighted by the level of detail at which the re-entry points are located in the hierarchy. Every ray finding a ray identifier in the cache may decrease the current success indication and every ray fulfilling the success criteria may increase the success indication (e.g., the success indication may be a ratio between successful rays and all rays finding a ray identifier in the cache). The success indication is weighted by level of detail as a higher level of detail (i.e., further down the acceleration structure) indicates fewer sub-tree intersection tests than a lower level of detail. The function used to weight the success of indication by the level of detail may not be able to predict the box or triangle intersection savings perfectly, but heuristically derived approximation may be sufficient for reasonable results. A dynamic re-entry point may be "walked" through the acceleration structure (i.e., incremented or decremented) in an attempt to find a better level of detail. That is, after a predetermined number of rays have been processed, and a success indication has been accumulated, the level of detail of the indication either increments of decrements. This results in the generation of a first success indication. After the same number of rays have been processed at the incremented/decremented level of detail, a second success indication is generated. The first and second success indications are then compared. If the second success indication is better than or equal to the first success indication, then the level of detail associated with the second success indication is maintained in the memory and the next level of detail for the indication is given by a further step in the same direction. If the second success indication is less than the first success indication, then the first level of detail is re-established and the process is repeated, proceeding in the opposite direction.

It is noted that, in the forgoing description, the term 'level of detail' has been related to the number of steps between a node and the root node. It might therefore be expected that, based on an equal sub-division of space from a parent node to its child nodes, all nodes at the same level of detail would represent the same amount of space. However, acceleration structure optimisation strategies may result in nodes being repositioned within an acceleration structure, such that even if an initial acceleration structure defines nodes at the same level of detail as representing the same amount of space, that may not be true in the optimised acceleration structure derived from that initial structure. As a result, it is further noted that it may be beneficial in some situations to choose re-entry points representing a fixed size (i.e. a fixed amount of space), rather than a fixed number of steps from the root node. The skilled person will understand how the methods disclosed herein could be adapted accordingly.

Adaptations may have to be made to re-entry points for instancing. Instancing splits the acceleration structure for the scene into a single top level acceleration structure and one or more bottom level acceleration structures reached during ray traversal. The acceleration structure is split by one or more instance transform nodes, which are associated with instance transform matrices. The instance transform nodes are leaf nodes of the top level acceleration structure. During traversal of the acceleration structure, and at the instance transform nodes, rays are transformed into instance space using the inverse transform to the original transform matrix. If instancing is used, then an extended re-entry point reference is required. This may require additional bit storage. The extended re-entry point encodes the location of the instance transform node of the bottom level acceleration structure within the top level acceleration structure, implicitly indicating the instance transform (and/or its inverse), as well as the location of the primitive within the bottom level acceleration structure. Ray identifiers are generated from untransformed ray attributes, so that ray identifiers can be identified regardless of in which bottom level acceleration structure an intersection occurred.

The memory 300 may be regularly updated when new re-entry points for rays are generated. The memory 300 may have a sufficient number of cache lines to store all of the ray identifiers and re-entry points for the rays to be tested by the ray tracing system. Alternatively, the memory 300 may have a limited number of cache lines so that the number of ray identifiers for all rays to be tested by the system surpasses the number of cache lines in the memory. In this latter example, existing entries in the memory may at some point need to be overwritten to make space for new ray identifiers and indications of re-entry points that are generated during intersection testing. This overwriting may be performed by a number of methods. In a first example, for a directly mapped cache, as there is only one way per set, the single cache line corresponding to the new ray identifier is overwritten. In a second example, for either a set-associative or fully-associative cache, a walking eviction policy may be implemented. In this example, after each new initialisation or replacement submission, the eviction iterator "walks" through all ways in the set corresponding to the new ray identifier before repeating a replacement of a way. This ensures that each entry in a cache line of the memory has the same lifespan. More specifically, the entry in each cache line in the memory has a lifespan of w submissions, where w is the number of ways per set in the cache (e.g., equal to the size of the cache for a fully-associative cache). The lifespan is irrespective of any subsequent lookups or updates to a cache line (i.e., read operations that address the entry in a cache line). A walking eviction policy is advantageous as it is computationally simple mechanism to implement.

In a third example, for either a set-associative or fully-associative cache, the memory may use a "least recently used" eviction policy. In this policy, a tree of way indices is generated that partially orders the ways of a set in the cache based on cache submissions and/or look ups. For the set corresponding to the new ray identifier, each new ray identifier submitted to the cache may replace or initialise (when the ray identifier corresponds to a set that does not already contain valid data for an identifier) the contents of the way in the minimal way index as encoded by the tree. The ordering of ray identifiers in the tree is varied in dependence on when the cache entries are submitted to and/or looked up. For example, if a cache line is accessed by a write or read operation, that cache line is reordered to the top of the tree, in front of other ways that have not been recently accessed. An advantage of the least recently used eviction policy is that it is more accurate in its selection of which entries to overwrite, as it places an importance on how frequently different memory entries are being used.

The ray identifier may be indicative of ray data. The ray identifier may not comprise exactly the same data as the ray. As is mentioned above, the ray representative may be a compressed, or generalised, representation of ray data. The compressed ray identifier may represent multiple rays. The multiple rays identified by the compressed ray identifier may be similar rays. Where a ray identifier is a compressed representation of ray data, the ray identifier may be referred to as a ray representative. The generation of a ray representative from raw ray data is illustrated in step S504 of FIG. 5A and step S526 of FIG. 5B. The ray representative may be further transformed into a quantised ray representative, as illustrated in step S506 of FIG. 5A and step S528 of FIG. 5B. The step of transforming raw ray data into a ray representative is illustrated in FIG. 9. This method may be performed by the processing logic of the ray tracing system 100.

The raw ray data, or uncompressed data, for a ray may comprise three direction components and three position components. That is, the ray may extend through three-dimensional space. The ray may have a first component that extends along an x-axis, a second component that extends along a y-axis and a third component that extends along a z-axis. In an alternative example, ray data may comprise two direction components and two position components. In other words, the ray may extend through two-dimensional space. In a further example, the ray may have more than three direction components and more than three position components (e.g., four position components and four direction components).

Figure 6:
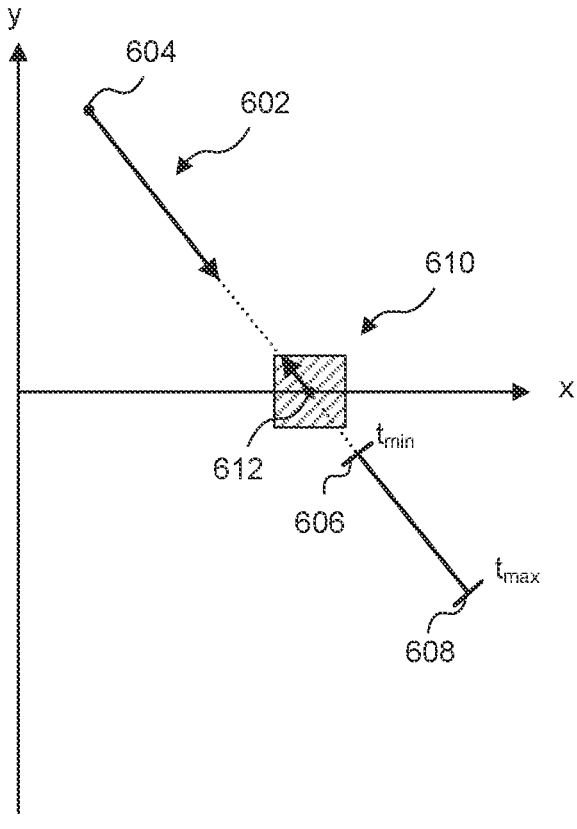
FIG. 6 shows an illustration of a ray, as well as an illustration of a ray representative for the ray.

An exemplary illustration of an uncompressed ray is illustrated in FIG. 6. The ray 602 is illustrated in a two-dimensional space. The two-dimensional space of FIG. 6 has a y axis extending in the vertical direction, and an x axis extending in the horizontal direction. From FIG. 6 it may appear that the ray 602 extends in only two dimensions. This may be the case. However, in an alternative example, the ray may extend in further directions. For example, the ray may extend in a third direction. In an example where the ray extends in a third direction, the space of FIG. 6 may be a three-dimensional space. That is, the space may have a z axis that extends in a direction that is perpendicular to both the y axis and the z axis (and perpendicular to the plane of the page, i.e., in or out of the plane of the page). In this latter example, the space in FIG. 6 is illustrated with only two axes for simplicity.

Each of the position components for a ray is used to represent the origin of the ray. More specifically, each position component for the ray is a coordinate that represents the origin of the ray. The origin of the ray may considered as the point from which the ray originates, or begins. In FIG. 6, the origin of ray 602 is illustrated by reference numeral 604. If the ray is a three-dimensional ray, for example, the origin of the ray will be identified by three position components. These three position components are an x component ($P_x$, denoting the position of the origin along the x axis), a y component ($P_y$, denoting the position of the origin along the y axis), and a z component ($P_z$, denoting the position of the origin along the z axis). Each of the direction components for a ray is a vector component representing the amount in which the ray extends from the origin in that direction or opposite to that direction. In other words, each direction component for the ray is comprised of a magnitude that represents the scale of the direction in which the ray extends, and a sign that represents the positive or negative direction in which the ray Is extending. The direction of the ray is illustrated by the arrow extending from the ray 602. If the ray is a three-dimensional ray, for example, the ray will have three direction components. These three direction components are an x component ($D_x$, denoting the magnitude and sign of the ray along the x axis), a y component ($D_y$, denoting the magnitude and sign of the ray along the y axis), and a z component ($D_z$, denoting the magnitude and sign of the ray along the z axis). The ray may further have maximal culling distances $t_{min}$ and $t_{max}$. The maximal culling distances for the ray $t_{min}$ and $t_{max}$ indicate the minimum and maximum culling distances for the ray, respectively. In FIG. 6, the minimum culling distance for the ray is denoted by reference numeral 606, and the maximum culling distance is denoted by reference numeral 608. The intersection determination for a ray may be based on whether the distance along the ray that the intersection occurs is between minimal and maximal culling distances for the ray. This inclusion may be inclusive or exclusive for each or both endpoints of the culling distance.

An identifier for a ray may be derived using all of its position and direction components. For example, where a ray is a three-dimensional ray, that ray may be represented by each of its three dimension and position components. The ray may be further represented using its $t_{min}$ and $t_{max}$ values. However, it may be beneficial to identify rays using a (compressed) ray identifier, equal to or quantised from a ray representative. One reason for this is that less storage resources are required to store compressed data in a memory such as memory 300. Another reason is that the (compressed) ray identifier can be used to identify multiple rays, thereby grouping rays together. This means that similar or even equivalent rays, or rays with similar or even equivalent ray data, can be identified by a common identifier. Identifying similar rays using the same identifier means that those rays can be processed similarly. More specifically, similar rays that are identified by the same ray identifier may be processed identically.

A method for compressing ray data to generate a ray representative is illustrated in FIG. 9. This method may correspond to step S504 of FIG. 5A, and/or step S526 of FIG. 5B. The method is initiated at step S902, where the direction component of the ray data that has the greatest magnitude is identified. In other words, the direction component of the ray that has the largest value is identified. The direction component of the ray with the largest value extends along one of the axes of the space through which the ray travels. Where the ray is a three-dimensional ray, the direction component of the ray with the largest magnitude extends along one of the x, y and z axes (i.e., is one of $D_x$, $D_y$ and $D_z$). If two or three axes have equally large magnitude, then a method of tie-break rule must be used to guarantee a (deterministic) selection.

After the direction component of the ray data with the greatest magnitude is determined, then at step S904 the axis of the identified direction component is defined as the major axis of the ray. So, the major axis of the ray is defined as the axis comprising the maximum magnitude of direction component for the ray. For example, if the direction component of the ray data with the greatest magnitude is the x axis component of the ray ($D_x$), then the major axis for the ray will be the x axis. Step S904 may be represented mathematically as follows:

$$(maj, d_u, d_v, d_w) = \begin{cases} (Z, d_x, d_y, d_z) & |d_z| \geq |d_x|, |d_y| \\ (Y, d_x, d_z, d_y) & |d_y| \geq |d_x| \\ (X, d_y, d_z, d_x) & \text{otherwise} \end{cases}$$

From the representation above it can be seen that, during transformation of the raw ray data into a ray representative, the x, y and z axes of the ray are permuted to the u, v, and w axes. More specifically, the minor axes of the ray are permuted to the u and v axes, with the major axis of the ray permuted to the w axis. Thus, in the equations above, $d_x$, $d_y$ and, $d_z$ are distance components for the raw ray data along the x, y and z axes respectively. $d_u$, $d_v$, and, $d_w$ are permuted values of the raw direction components. $d_w$ is the permuted distance component along the major axis. $d_u$ and $d_v$, are the permuted distance components along the minor axes.

At step S906, after the major axis for the ray has been determined, a translated position on the ray is determined at which the position component along the major axis is zero. As mentioned above, the position components of a ray represent the origin of that ray. So, at step S906 the ray data is translated so that its origin is located on the major axis. This means that the value of the position component of the ray along the major axis is translated to zero. The values of the position components along the axes that are not the major axis may be translated in accordance with the translation of the position component for the major axis. An advantage of the position component of the ray along the major axis being reduced to zero is that, if the ray data for each ray is adapted in this way, it can be assumed that one position coordinate for each ray will have a value of zero. Thus, the position component for each ray along the major axis can be removed from the ray data. This compresses the ray data. Step S906 may be illustrated mathematically as follows:

$$(p_u, p_v, p_w) = \begin{cases} (p_x, p_y, p_x) & maj = Z \\ (p_x, p_z, p_y) & maj = Y \\ (p_y, p_z, p_x) & maj = X \end{cases}$$

$$P_u = p_u - \frac{d_u}{d_w} p_w \in [-2E, +2E]$$

$$P_v = p_v - \frac{d_v}{d_w} p_w \in [-2E, +2E]$$

In the above equations, $p_x$, $p_y$ and $p_z$ are position components for the raw ray data along the x, y and z axes respectively. $p_u$, $p_v$ and, $p_w$ are permuted values of the raw direction components, with p w being the distance component along the major axis. $p_u$ and $p_v$ are the permuted distance components along the minor axes of the ray. $P_u$ and $P_v$ are the translated position components for the ray along the minor axes. The value 'E' represents the scene extents, which provides a bounding size to the scene geometry. In other words, the value E represents a real number such that the cuboid $[-E, E]^3$ contains the entire scene. In some implementations, E may be a power of 2.

At step S908, the three direction components of the ray are rescaled so that the value of the direction component along the major axis is one. This is achievable as the direction component along the major axis is guaranteed to be non-zero for a valid ray direction. In other words, each of the direction components of the ray is reduced in magnitude so that the magnitude of the components is between zero and one (inclusive). The maximum value of a direction component for the compressed ray is the value of the component that is along the major axis, which is one. An advantage of the direction component of the ray along the major axis being rescaled to one is that, if the ray data for each ray is adapted in this way, it can be assumed that one direction coordinate for each ray will have a value of one. Thus, the direction component for each ray along the major axis can be removed from the ray data. This compresses the ray data. This compression is essentially lossless on the position and direction of the rays. It is essentially lossless as the mathematical operations are invertible (i.e., injective) on the set of infinite lines associated with those rays, however some loss may be introduced due to a lack of numerical precision/ accuracy in any floating-point arithmetic operations (e.g., addition, subtraction, multiplication, division, etc.). Step S906 may be illustrated mathematically as follows:

$$D_u = \frac{d_u}{d_w} \in [-1, +1]$$

$$D_v = \frac{d_v}{d_w} \in [-1, +1]$$

$D_u$ and $D_v$ are the rescaled direction components for the ray along the minor axes. Although step S908 is illustrated in FIG. 9 as occurring after step S906, in an alternative example step S906 may be performed after, or simultaneously with, step S908. It may be less computationally intensive for step S908 to occur before step S906. The resultant ray representative that is generated by the processing logic comprises (i) the two position components of the translated position of the ray along the axes which are not the major axis, and (ii) the two rescaled direction components of the ray along the axes which are not the major axis. The ray representative does not comprise a position component or a direction component for the major axis of the ray. The axes which are not the major axis may otherwise be referred to as the minor axes. The ray representative may further comprise a value indicating the major axis of the ray. The ray representative may further still comprise a value for the sign of the direction component along the major axis.

An example of a ray that has been compressed using the method of FIG. 9 is illustrated by reference numeral 610 in FIG. 6. The compressed ray 610 in FIG. 6 is a compressed version of the ray 602. As is illustrated in FIG. 6, the major axis for the ray 602 is the y axis. That is, the direction component of the ray 602 with the greatest magnitude is the component that extends along they axis. FIG. 6 does not illustrate a z axis, however it is assumed for the purpose of this example that the ray extends to a lesser extent along the z axis than it does along the y axis. In order to compress the data for ray 602, it is first established that the direction component of the ray data has the greatest magnitude in the y direction. Then, the y axis is defined as the major axis for the ray. Once the y axis has been defined as the major axis, a translated position on the ray can be determined at which the position component along the y axis is zero. This is illustrated in FIG. 6 by the origin of the ray 612 being projected to the x axis. Where the space of FIG. 6 comprises three directions, the ray origin 612 may instead be pinned to the x-z plane. By projecting the ray origin 612 to lie in the x-z plane, the position component for the ray in the y direction ($P_w$) is set to zero. The remaining position components for the ray, in the x and z directions, are translated to become ($P_u$, $P_v$) to account for the projecting of the ray onto the axis plane.

The direction components of the ray are also rescaled so that the new direction component along the y axis ($D_w$) has a value of one.

The rescaling of the ray means that the length of the ray along the y axis is reduced to 1. This may be done by dividing the direction component by itself. The remaining direction components for the ray are rescaled in accordance with the major axis component so that the new direction components ($D_u$, $D_v$) have a magnitude of less than one. That is, the rescaled direction components each have a magnitude of no more than one. Each of the direction components may be rescaled by dividing their value by the value of the (unscaled) direction component along the major axis.

The resulting compressed ray 610 can be fitted within a square (or cube) in the two-dimensional (or three-dimensional) space shown in FIG. 6. The tip of the rescaled direction of the compressed ray 610 lies on the boundary of the box with extents of ±1 unit in each direction around the projected position of the compressed ray. As has been mentioned above, the compressed ray 610 has one position component ($P_v$) that has a value of zero, and one direction component ($D_v$) that has a value of one. If the above approach is followed to generate ray representatives for each ray that is processed by the ray tracing system, then the values of these components do not need to be stored. This means that the quantity of data that has to be stored in order to identify a ray is decreased, and therefore the memory resources required to store ray data are reduced. It also means that equivalent rays (i.e., rays that are part of the same infinite line through a scene) are mapped onto a single ray representative.

It has been mentioned that the compressed ray may otherwise be referred to as a ray representative. As mentioned above, the uncompressed ray may be a three-dimensional ray. That is, the raw data for a ray may comprise three position components and three direction components. The ray representative that is compressed according to the method of FIG. 9 comprises two fewer components than the uncompressed ray. More specifically, the ray representative comprises one fewer direction component and one fewer position component. This means that the ray representative comprises exactly two direction components and exactly two position components. In other examples, for example where the ray is a two-dimensional ray, further components of the ray may be compressed so that the ray representative comprises only one direction component, or only one position component. The uncompressed ray may comprise more than three position components and/or more than three direction components. In this example, the compressed ray may have more than two direction components and/or more than two position components, but will have fewer position components and/or directions components than the uncompressed ray.

In addition to the two direction components and the two position components, the compressed ray (or ray representative) may further comprise an indication of the major axis for the ray. The indication of the major axis for the ray may comprise a trit, or at least two bits. In other words, the compressed ray may comprise data that identifies the axis along which the direction component of the ray has the greatest magnitude. An advantage of storing an indication of the major axis for the ray is that that indication may be used to decompress the ray data. A further advantage is that the indication can be used as part of the ray identifier, and as input to the hashing function (outlined below) that generates the set index for a memory storing the ray data, to distinguish between dissimilar rays with different major axes. The indication of the major axis may also be used to further identify the ray, as it distinguishes a ray that has its major component extending along the x axis, for example, from one that has its major component extending along an alternative axis.

The compressed ray data may be stored using a predefined number of bits. Storing the ray data using a predefined number of bits means that the data can be uniformly stored within a memory resource such as the memory of FIG. 3. Each position and direction component of the raw ray data may be comprised of a predefined number of bits. For example, each position and direction component of the raw ray data may comprise 32 bits. Thus, the raw data for a ray may comprise 192 bits in total. By reducing the number of components included in the compressed ray data by two, the number of bits of the ray identifier (or ray representative) may be decreased by 64 bits. Where the compressed ray data comprises an indication of the major axis, this indication may comprise two bits. It is advantageous that the indication of the major axis is formed of two bits, as a two-bit field allows for four distinct combinations of bit values to be obtained. Thus, where a ray is a three-dimensional ray, or a four-dimensional ray, distinct identifier values for each axis through which the ray extends may be covered by a two-bit indicator. Where the ray is a two-dimensional ray, the identifier values for each axis through which the ray extends may be covered by a single bit indicator. The compressed ray data, in total, may comprise 130 bits (four 32 bit direction/position components and a two-bit representation of the major axis).

In addition to a magnitude, each of the position and direction components for a ray may be prefaced by either a positive or a negative sign. The sign in front of each of the position and direction components represents the location or the direction in which the component is travelling. For example, in FIG. 6 the ray 602 is travelling in a positive direction (from left to right) along the x axis. Thus, the direction component for the ray along the x axis will be accompanied by a positive sign. The ray 602 is travelling in a negative direction (from top to bottom) along the y axis. Thus, the direction component for the ray along the y axis will be accompanied by a negative sign. In an example, the sign accompanying the direction component for the ray along the major axis may be removed. This is illustrated in FIG. 6, where the direction of the compressed ray 610 is reversed from the direction of the uncompressed ray 602 so that it extends in a positive direction on the y axis (from bottom to top) instead of in a negative direction. The direction of the ray along each of the minor axes, or in the case of FIG. 6 along the x and z axes, is also reversed. This ensures that the line represented by the ray direction is unchanged when the sign for the direction along the major axis is removed. An advantage of removing the major axis sign from ray data is that it further decreases the amount of data in the ray representative. This means that the memory resources required to store the ray representative, in a memory such as the memory 300, are further reduced. At the same time, the signs indicating the positive/negative direction of the ray along the major axis may not have a lot of impact on efficiency of results as it does not affect the infinite undirected line in which the ray is contained. Where the sign is removed, it is assumed that the direction of the ray along the major axis is positive. Thus, the rescaling of the three-direction components in step S908 of FIG. 9 may be such that the value of the direction component along the major axis is plus one. This method step is particularly relevant for data stored in the memory of FIG. 3, as it has been empirically determined that this sign bit does not have significant impact on the efficiency of this memory, especially when there is reasonable coherency in the input ray data.

In addition to the direction and position components, the compressed ray data may further comprise a minimum distance component and a maximum distance component, representing a non-empty interval. That is, the compressed ray data may further comprise indications of $t_{min}$ and $t_{max}$ for the ray. $t_{min}$ and $t_{max}$ may denote a two-dimensional distance range for the ray. Thus, $t_{min}$ and $t_{max}$ may otherwise be referred to as distance range components. Where the compressed ray data further comprises indications of $t_{min}$ and $t_{max}$, the compression method may further comprise rescaling and translating the minimum and maximum distance components for the ray, generating values $T_0$ and $T_1$ respectively, based on the translated position and rescaled direction of the ray. The rescaling and translating of the minimum and maximum distance range components for the ray may be represented mathematically as follows:

$$T_0 = d_w t_{min} + p_w$$

$$T_1 = d_w t_{max} + p_w$$

Where $T_0$ is the compressed value of $t_{min}$ and $T_1$ is the compressed value of $t_{max}$.

More specifically, the minimum and maximum distance components for the ray may be rescaled and translated by determining the correct number of ray lengths from the new ray position to the positions indicated by $t_{min}$ and $t_{max}$ in the old distance range. That is, with reference to FIG. 6, $t_{min}$ may be rescaled and translated to the value $T_0$ for the compressed ray 610 by determining the correct number of ray lengths from the origin 612 to the original value of $t_{min}$ 606. $t_{max}$ may be rescaled and translated to the value $T_1$ for the compressed ray 610 by determining the correct number of ray lengths from the origin 612 to the original value of $t_{max}$ 608. The correct number of ray lengths is calculated with respect to the new (rescaled) direction magnitude ($D_u$, $D_v$, $D_w$) for the compressed ray data, where $D_w$ has a value of one. It has been mentioned above that $t_{min}$ is the minimum value of t on the ray which is not culled, and that $t_{max}$ is the maximum value of t on the ray which is not culled. If $t_{min}$ and/or $t_{max}$ are negative, then $t_{min}$ is not necessarily closer than $t_{max}$ to the ray origin. I.e., the "closest" intersection of the ray with a primitive may be the intersection at which the ray has a t value closest to minus infinity, and not necessarily the intersection at which the ray has a t value closest to zero (i.e., the closest intersection to the origin). The signs of the transformed values of $t_{min}$ and $t_{max}$, namely $T_0$ and $T_1$, may be flipped by the sign of the direction component for the ray that extends along the major axis during the rescaling and translating if the sign is negative. For example, where a negative direction component along the major axis for a ray is negated to a positive one (i.e., the negative sign is removed), the signs of the transformed values of $t_{min}$ and $t_{max}$, namely $T_0$ and $T_1$, are also negated. This can be explained with respect to FIG. 6, where the direction of the compressed ray 610 along the major (y) axis has been reversed. Therefore, the order of $T_0$ and $T_1$ may be swapped to ensure that $T_0$ is less than $T_1$. Reordering of $T_0$ and $T_1$ does not occur where the ray data from the representative will subsequently be decompressed (i.e., where representations of the original values of $t_{min}$ and $t_{max}$ are to be obtained from $T_0$ and $T_1$ in the compressed representative), unless the sign of the major axis component for the ray is stored separately in the compressed representative. If ray data is not to be decompressed, the order of $T_0$ and $T_1$ may be swapped during computation of the ray representative to ensure they represent a non-empty interval. In FIG. 6, as the compressed ray travels in the opposite direction, the minimum distance component for the ray is now the component previously labelled as $t_{max}$ 608, with value $T_1$ in the compressed ray representative, and the maximum distance component for the ray is now the component previously labelled as $t_{min}$ 606, with value $T_0$ in the compressed ray representative.

Where the uncompressed ray data represents an eight-dimensional ray (i.e., a ray with data comprised of three position components, three direction components and two distance range components), The eight-dimensional ray may comprise uncompressed data with a bit width of 256 bits. By removing one dimension component and one position component from the ray data, the value of this ray may be reduced to 194 bits (six 32 bit direction/position components and a two-bit representation of the major axis), i.e., a reduction by 62 bits.

In order to further compress the ray data, the ray representative may be converted into a quantised ray identifier. The conversion of a ray representative into a quantised ray identifier, or quantised ray representative, may correspond to step S506 in FIG. 5A and/or step S528 in FIG. 5B. The quantised ray identifier may be a data packet, or may be comprised within the data packet, that includes data indicating various features of the ray. For example, the quantised ray identifier may include data that includes the major axis of the ray, and/or indicates the two position components of the translated position and/or indicates the two rescaled direction components and/or indicates the two rescaled and translated distance range components. Thus, the quantised ray identifier can be used to identify the most significant properties of the ray.

The quantised ray identifier may have a fixed bit-width. In other words, the quantised ray identifier may be of a predetermined size, or formed of a predetermined number of bits. An advantage of quantised ray identifiers having a fixed bit-width is that these identifiers, alongside fixed bit-width indications of re-entry points, can each fit in the identical cache lines of the memory 300. The quantised ray identifier may have a bit width of 18 bits. In this example, an entry in a cache line (comprising a ray identifier and an indication of a re-entry point) can fit into 64 bits (18 bits for the ray identifier and 46 bits for the re-entry point), i.e., 8 bytes. The memory resources utilised by one bank of memory comprising 256 sets with 2 ways per set and 8 bytes per way equate to those of a small L1 cache memory or a large L0 cache memory. In the example where an unquantized ray representative has a bit width of 130 bits, the bit width of that data can be significantly decreased through quantisation to form a quantised ray representative. The quantised ray identifier may have a bit width of 128 bits. The quantised ray identifier may comprise 15 bits for each quantised direction component and 24 bits for each position/range component. The quantised ray identifier may provide a 50% compression rate on the raw ray data. In order to form a quantised ray representative, each component of the ray data may be decreased to a predefined number of bits. In a first approach, this may be done by initially converting floating-point minor direction components to a fixed-point format before quantising them. This can be achieved by offsetting each floating-point minor direction component of the ray data by a value of three. It is known that each of the minor direction components for a compressed ray lies in the closed interval [−1,1]. Shifting each of these components up by a value of three puts them into the interval [2,4]. Clamping to the half-open interval [2, 4) ensures that all floating-point values for the ray data have equal exponent, and are therefore purely defined by their mantissa. Thus, the top number of most significant mantissa bits of each component can be extracted as the quantised fixed-point value of the component. In a second approach, where the values of the components of the quantised ray identifier are already fixed-point values, the top number of most significant bits from a component value may be extracted as the quantised value of the component. In the first approach, rescaling the minor position/range components by (a multiple of) the scene extents size E can also put the minor position/range components into the interval [−1,1] so that they can be treated identically to the minor direction components.

In a third approach, each component of the ray data may be decreased to a predefined number of bits to form a quantised ray representative while remaining in a floating-point format. Quantising the position and range components of a ray identifier to a shorter floating-point format may comprise reducing (a) the number of exponent bits, (b) the number of mantissa bits, or (c) both the number of exponent and mantissa bits, of each component. The number of exponent bits in each direction/position/range component may be reduced to zero. This effectively provides a fixed-point representation of the component. The number of mantissa bits in each direction/position/range component may also be reduced to zero. This is particularly useful if the full limits of the floating-point format are required (e.g., because the scene extents cannot be retrieved) but where a minimal number of bits for the components is used.

Figures 7A, 7B, 8:
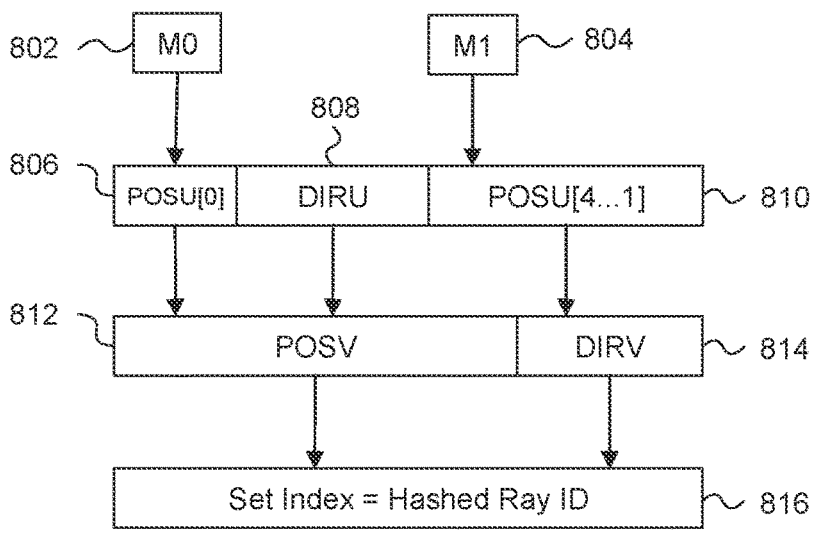
FIGS. 7A and 7B show examples of quantised ray representatives.
FIG. 8 shows an exemplary method for generating of a hashed result of the quantised ray identifier representing the ray representative.
Figure 11:
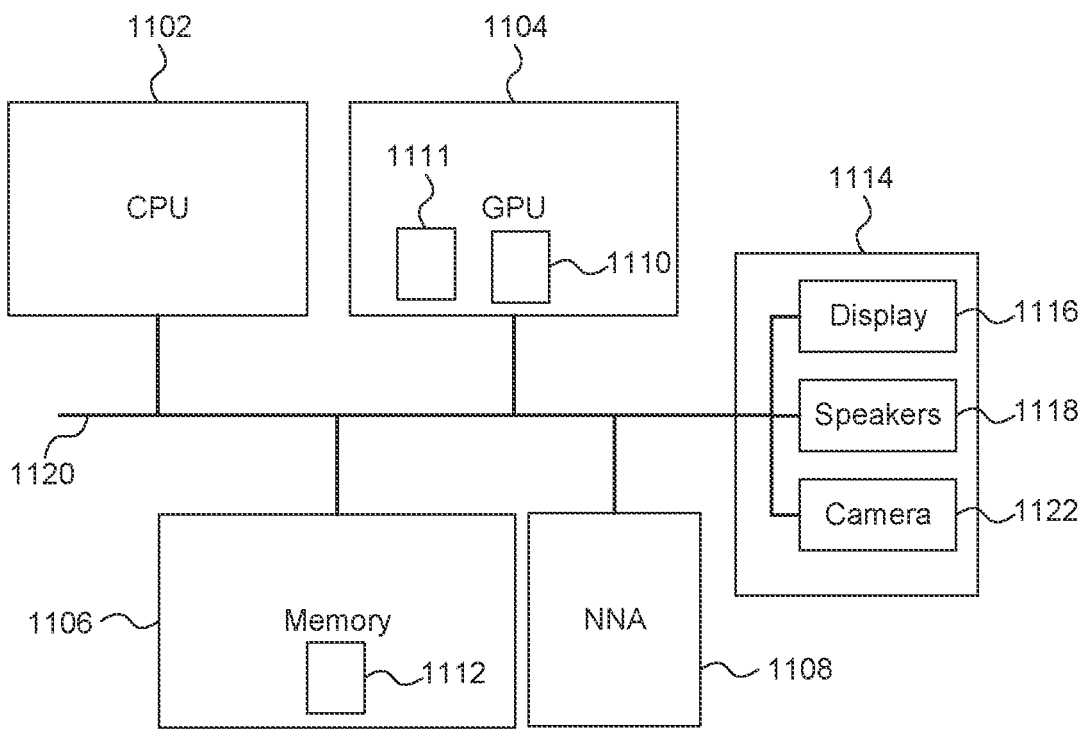
FIG. 11 shows a computer system which implements a computing system as described herein.

A first example of a quantised ray identifier 700A is illustrated in FIG. 7A. The quantised ray identifier may correspond to the unquantised, but compressed, ray 610 of FIG. 6. The quantised ray identifier may be a data packet comprising a number of portions. In FIG. 7A, the quantised ray representative comprises five portions. A first portion 702 of the packet, denoted MAJ, may identify the major axis of the ray. The first portion 702 may be formed of two bits. A second portion 704 of the packet, denoted POSU, may identify a first position component for the ray ($P_u$). A third portion 706 of the packet, denoted DIRU, may identify a first direction component for the ray ($D_u$). A fourth portion 708 of the packet, denoted POSY, may identify a second position component for the ray ($P_v$). A fifth portion 710 of the packet, denoted DIRV, may identify a second direction component for the ray ($D_v$). Each of the position components may have a bit width of five bits. In other words, the data in the data packet for the quantised ray identifier may comprise no more than five bits to indicate each of the two position components of the translated position along the axes which are not the major axis (i.e., the minor axes). Each of the direction components may have a bit width of no more than three. In other words, the data in the data packet for the quantised ray identifier may comprise no more than three bits to indicate each of the two rescaled direction components along the axes which are not the major axis (i.e., the minor axes). Thus, the bit width of each position and direction component may be significantly decreased from 32 bits to five bits or fewer per component. The quantised ray identifier may comprise 15 bits for each of its direction components and 24 bits for each of its position components. An advantage of the position and direction components having limited bit widths in this way is that the memory resources required to store the quantised ray identifier may be minimised. As mentioned above, the data packet for the quantised ray identifier may have a total bit width of 18. An alternative benefit to these position and direction components having limited bit widths is that it allows for the compression of ray data, which enables similar rays to be grouped together under a single ray identifier. The ordering of the portions within the packet may be different from the ordering illustrated in FIG. 7A.

A second example of a quantised ray identifier 700B is illustrated in FIG. 7B. The ray identifier 700B is the same as the identifier 700A, except for that its data packet comprises two additional portions. That is, the ray identifier 700B may be a data packet comprise a total of seven portions. The sixth portion 712 of the packet, denoted RNG0, may identify a first (minimum) distance range component for the ray. The seventh portion 714 of the packet, denoted RNG1, may identify a second (maximum) distance range component for the ray. As with the position components POSU and POSV, each of the distance range components in the quantised ray identifier 700B may comprise 24 bits.

The method of FIG. 9 may further comprise generating a hashed result of the quantised ray identifier representing the unquantised/quantised ray representative. The result of the hash may otherwise be referred to as a set index that can be used to identify where to look for matching data stored in the cache, e.g., for a directly mapped cache. The set index may be used to identify an entry that is stored in a memory, and for which a read or write operation may be performed. The hashed result has a smaller bit width than the quantised ray identifier for which it is generated, such that it is a many-to-one mapping. In one example, where the quantised ray identifier has an 18-bit width, the hash may be a mapping from 18 bits to 8 bits. That is, the hashed result may comprise 8 bits. An 8-bit width for the set index used to reference a memory allows for fewer sets resulting in smaller memories, e.g., caches.

A hashing method for generating a hashed result of a quantised ray identifier is illustrated in FIG. 8. The hashing method comprises shuffling and merging the components of the quantised ray identifier to form a set index equal to the hashed ray identifier. The shuffling and merging of components in the quantised ray identifier may otherwise be referred to as combining ray identifier components using a bitwise binary operation. The combining of components may be achieved by performing logical XOR operations on the bits of the quantised ray identifier to reduce the number of bits of the identifier. A logical XOR operation is a binary operation. It is suitable for use in generating the hashed ray identifier as any change in an input bit is reflected in a change in an output bit. The logical XOR operation considers the individual components of the quantised ray identifier, i.e., it is a bitwise operation.

The quantised ray representative comprises a first bit for the major axis 802, a second bit for the major axis 804, one or more bits for the first position component 806/810 for the ray (POSU[0], POSU[4 . . . 1]), one or more bits for the second position component 812 of the ray (POSV), one or more bits for the first direction component 808 of the ray (DIRU) and one more bits for the second direction component 814 of the ray (DIRV). The one or more bits for the first position component may be separated into a first bit 806 for the zeroth position component, and the remaining bits 810 of the first position component. The bitwise XOR operation combines, in a first sub-operation, the first bit of the major axis 802 with the least significant bit 806 of the first position component. At the same time, in a second sub-operation, the second bit of the major axis 804 is combined with the most significant bit of the remaining bits 810 of the first position component. In an alternative example to that which is illustrated in FIG. 8, the first bit of the major axis, i.e., M0, may be combined with the most significant bit of the remaining bits of the first position component in the second sub-operation. In this alternative example, the second bit of the major axis, i.e., M1, is combined with the least significant bit of the first position component in the first sub-operation. The purpose of the first two sub-operations is to combine the ray major axis components 802 and 804 with the most significant bits of the position coordinates of the ray identifier POSU and POSV respectively, as made clear after the third sub-operation: the results of the first and second combinations are combined with the bits representing the second position component and the second direction component. The resultant bits from this further operation are combined (e.g., bitwise XORed) together to generate a set index for the hashed ray identifier. The purpose of the third sub-operation is to maximise bit coverage for the two direction components, by minimising the overlap of the two direction components. This maximises the change in the set index given a change of any size in the quantised ray direction. Additionally, the bit coverage for the two position components is maximised by minimising the overlap of the two position components, maximising the change in the set index given any change of size in the quantised ray position. At the same time, the mutual overlaps of the least significant bits of the ray identifier components are minimised to maximise the change in the set index given a change of small size in any subset of the ray identifier components, i.e., the components of both the quantised ray direction and position. The results of the third sub-operation generates the hashed ray identifier 816.

The effectiveness of the combining of the ray identifier components by the bitwise XOR operation described above relies on the following assumptions:

That coherent rays will often have almost the same position but differing directions;

That coherent rays will often have almost the same direction but differing positions;

That coherent rays will often have similar, but different, directions and positions;

That the least significant bits of ray identifier components will change more frequently than the most significant bits of ray identifier components; and That achieving a uniformly random change in an output bit given a (non-uniformly) random change in an input bit, as determined by a momentary distribution of rays, results in a hashed ray identifier that has best utilisation of the memory, e.g., cache (in terms of minimising cache collisions).

As mentioned above, the ray representative may be used to store an identifier for the ray in a memory such as the memory illustrated in FIG. 3. The memory may be a cache. The cache may store data for intersection testing that is used by the ray tracing system to render an image of a scene. An advantage of using the ray identifiers for a memory as illustrated in FIG. 3 is that the data losses associated with bundling ray data for different, but similar, rays into the same ray identifier are minimised. More specifically the problem is addressed by first converting six-dimensional floating-point ray data for a ray into a four-dimensional floating-point ray representative, and secondly by generating a quantised ray representative from that ray representative. In other words, the ray representative generation techniques described herein can be used to represent multiple similar rays using the same identifier whilst ensuring that an accurate representation of each ray is achieved.

In some examples, it may be necessary to convert compressed ray data back into uncompressed ray data. In other words, it may be necessary to convert a ray representative into ray data for a ray. A method for decompressing compressed ray data is illustrated in FIG. 10. The data that is to be decompressed using the method illustrated in FIG. 10 may be data that has been compressed using the method illustrated in FIG. 9. Alternatively, the data to be decompressed may be data that has been compressed by other means. The compressed ray data, as has been mentioned above, is a compressed representation of the ray data and comprises: (i) two position components of the translated position of the ray, (ii) two direction components for the ray. In the case where data is to be decompressed, the data further comprises an indication of the major axis for the ray and a sign of a third direction component for the ray. The data may further comprise two distance range components for the ray.

The method of FIG. 10 is initiated at step S1002, where a third position component of the ray is inserted into the ray data in dependence on the indication of the major axis for the ray. The third position component for the ray corresponds to the position component that was removed during compression. The third position component represents the position of the origin of the ray along the major axis. The origin of the ray, during ray compression, was translated so that the third position component for the origin had a value of zero. Thus, the position component that is added to the ray data during decompression has a value of zero. The indication of the major axis for the ray indicates the location within the ray data at which the new position component is inserted. For example, if the major axis is the x axis, then it is the x component of the position at which the new position component is inserted into the decompressed ray data. The two position components of the compressed ray data are inserted into the other two position components of the decompressed ray data, e.g., the y and z position components.

At step S1004 a third direction component of the ray is inserted into the ray data in dependence on the indication of the major axis for the ray. The third direction component for the ray corresponds to the direction component that was removed during compression. The third direction component represents the magnitude of the direction of the ray along the major axis. As mentioned above the third direction component, when compressed, has a value of one. Thus, the direction component that is added to the ray data during decompression has a value of one. The indication of the major axis for the ray indicates the location within the ray data at which the new direction component is inserted. For example, if the major axis is the x axis, then it is the x component of the direction at which the new direction component is inserted into the decompressed ray data. The two direction components of the compressed ray data are inserted into the other two direction components of the decompressed ray data, e.g., the y and z direction components.

The method of decompressing may further comprise adding further bits to each of the two direction components and the two position components of the ray representative, wherein the further bits are least significant bits. The further bits are added in order to pad the bit width of the position and direction components out to the width of the original direction and position components. For example, if each of the compressed direction components has a bit width of 15, and each of the uncompressed direction components has a bit width of 32, then 17 additional bits may be added to increase the number of bits in these components up to 32. Similarly, if each of the compressed position components has a bit width of 24, and each of the uncompressed position components has a bit width of 32, then 8 additional bits may be added to increase the number of bits in these components up to 32. These additional "pad" bits may be appended to either the whole of a component in a fixed-point format, or to only the mantissa of a component in a floating-point format. These additional "pad" bits may be one of the following:

All zeroes (the minimum representative of a group of rays)

A zero followed by ones (a median representative of a group of rays)

A one followed by zeroes (a median representative of a group of rays)

All ones (the maximum representative of a group of rays) Where floating-point components of the ray identifier have been converted into corresponding fixed-point components, then this must be undone during decompression to generate floating-point components, either before or after appending the "pad" bits. This does not have to be done if the components of the raw (uncompressed) ray data are already fixed-point components.

The ray representative may further comprise a minimum distance component and a maximum distance component. Where the ray representative comprises these additional components, the method further comprises adding further bits to each of the minimum distance component ($t_{min}$) and the maximum distance component ($t_{max}$), wherein the further bits are least significant bits. Similarly to as is mentioned above, the further bits are added to $t_{min}$ and $t_{max}$ in order to pad the bit width of these components out to their original width. The further "pad" bits may be any of the exemplary combinations of bits provided above.

The method may further comprise decoding a sign for the third, i.e., major, direction component of the ray data in dependence on the compressed values of $t_{min}$ and $t_{max}$, namely $T_0$ and $T_1$. Each direction component for the ray must then be multiplied by this sign of the third direction component, to undo the reversing of the ray direction that was performed during compression (i.e., negated if the sign is negative). In other words, after the sign is added to the third direction component, the signs of the remaining direction components may be flipped (e.g., XORed) using the sign of the third direction component. This method step may be performed for compressed data where the negative sign for the major direction component has been removed during compression. It may also be performed for compressed data that comprises an indication of $t_{min}$ and $t_{max}$, namely $T_0$ and $T_1$. Where $T_0$ and $T_1$ are stored for compressed ray data, an analysis is performed to determine whether the value of $T_1$ is greater than the value of $T_0$. As described above, assuming that the values of $t_{min}$ and $t_{max}$ are not the same, the compressed values of $t_{min}$ and $t_{max}$, $T_0$ and $T_1$, may end up out of order after compression with a negative sign. In an example where the value of $t_{min}$ is equal to the value of $t_{max}$, then, as an initial compression step, one of the values of $t_{min}$ and $t_{max}$ may be perturbed by the smallest possible value, e.g. by decrementing or incrementing a mantissa least significant bit (aka machine epsilon) of $t_{min}$ or $t_{max}$ respectively, to ensure that the two values are distinct (sufficient precision may need to be used to ensure that the two values remain distinct after being rescaled and translated to $T_0$ and $T_1$). If the value of $T_0$ is greater than the value of $T_1$, then it is determined that the sign in front of the direction component on the major axis is a positive sign. If the value of $T_0$ is greater than the value of $T_1$, then it is determined that the sign in front of the direction component on the major axis is a negative sign. Once the correct sign has been identified, that sign is placed in front of its corresponding direction component. Then, all of the ray direction components are multiplied by the sign of the major direction component. In other words, in addition to the major direction component, the remaining minor direction components for the ray are also multiplied by the sign of the major direction component. This reverts the entirety of the ray direction and ensures that the reversing of the ray direction applied during compression is undone. Finally, $T_0$ and $T_1$ are assigned to the decompressed $t_{min}$ and $t_{max}$ by re-establishing the correct order. Alternatively, this sign bit may be stored separately and not encoded in the dependence on $t_{min}$ and $t_{max}$.

The method of FIG. 10 may further comprise, in assigning decompressed minimal and maximal distance components $t_{min}$ and $t_{max}$, reordering the compressed distance values $T_0$ and $T_1$ in dependence on which of the two values is closest to negative infinity.

The decompressed ray data that is obtained from the method illustrated in FIG. 10 might not be exactly the same as the ray data that was originally compressed. Thus, the decompression method of FIG. 10 may be described as a lossy decompression technique. Although it is not exactly the same as the original data, the differences between the decompressed data and the original data will be small, and obtaining decompressed data can still be useful. The use of lossy data is especially beneficial in image and video compression applications. Lossy decompression allows for a significant reduction in data sizes when compared to lossless compression techniques, whilst not substantively impacting the visual or perceived quality of the end results. Within the application of ray tracing, the compression method described above drops some number of bits (least significant bits) from the ray representative under the assumption that the compressed level of precision is higher than is required, especially for the direction component(s) of the ray. A fixed-point encoding may be more beneficial than a floating-point encoding for the direction components of a ray. This is because a fixed-point encoding spreads errors in the direction components more evenly around the boundary of the unit sphere for the compressed ray, whereas floating-point encoding focuses most precision around the axis plane great circles, and further still around the axis poles. Removing this redundant level of precision makes little to no difference to the end result achieved by the ray identifier. Thus, lossy compression techniques are suitable for use with the ray representatives described herein, as the loss of precision is negligible when compared to the reduction in data size that is achieved.

The method described in FIGS. 9 and 10 may be performed by a ray tracing system such as the system illustrated in FIG. 1. That is, the ray tracing system of FIG. 1 may be configured to convert ray data for a ray into a ray representative. The ray representative, as described above, is a compressed representation of the ray data. As has also been described above, the ray data may comprise three direction components and three position components for the ray. More specifically, the method described in FIG. 9 may be performed by processing logic comprised within the ray tracing system of FIG. 1. The processing logic may be configured to perform the steps illustrated in FIG. 9. In other words, the processing logic is configured to: identify which of the three direction components of the ray data has the greatest magnitude, and define the axis of the identified direction component as the major axis of the ray, determine a translated position on the ray at which the position component along the major axis is zero and rescale the three direction components of the ray so that the value of the direction component along the major axis is one. The resultant ray representative that is generated by the processing logic comprises (i) the two position components of the translated position of the ray along the axes which are not the major axis, and (ii) the two rescaled direction components of the ray along the axes which are not the major axis.

The processing logic of the ray tracing system in FIG. 1 may be further configured to rescale and translate the minimum and maximum distance components based on the translated position and on the rescaled direction of the ray.

The processing logic may be further configured to convert the ray representative into a (quantised) ray identifier by generating a data packet for the ray representative that includes data that indicates the major axis of the ray, two (quantised) position components of the translated position and two (quantised) rescaled direction components.

Similarly, the method described in FIG. 10 may be performed by processing logic comprised within the ray tracing system of FIG. 1. That is, the ray tracing system of FIG. 1 may be configured to convert a ray representative into ray data for a ray, wherein the ray representative is a compressed representation of the ray data and comprises: (i) two position components of the translated position of the ray, (ii) two direction components for the ray, and (iii) an indication of the major axis for the ray. The processing logic of the system may be configured to insert a third position component of the ray in dependence on the indication of the major axis for the ray, where the third position component has a value of zero and to insert a third direction component of the ray in dependence on the indication of the major axis for the ray, where the third direction component has a magnitude of one.

The ray tracing system of FIG. 1 may further comprise a memory such as the memory illustrated in FIG. 3. The memory of the ray tracing system may be a cache. The cache may be referred to as a likely hit cache. Where the ray tracing system comprises a memory such as that which is illustrated in FIG. 3, the ray representatives generated by the system may be used to store an indication of the ray in the cache. The ray tracing system may be further configured to retrieve data from the cache for intersection testing that is used to render an image of a scene. In other words, the ray representatives generated by the ray tracing system may be used to perform ray tracing operations.

Although the methods of FIGS. 9 and 10 are described herein for use with a memory as illustrated in FIG. 3, it would be appreciated that the compression and decompression techniques may have other applications. An exemplary purpose of ray attribute compression is to reduce storage requirements whenever ray data is stored in memory, especially in local memory in a ray tracing system (e.g., by making caches narrower, as the width of ray data is reduced, or by making caches shorter, as more rays can be packed into a single cache line). Another purpose of ray attribute compression is to simplify arithmetic in ray and geometry intersection tests by reducing or simplifying arithmetic operations. This may be achieved in three ways. Firstly, a ray with a unital direction component and/or zero position component may reduce the number of required multipliers and/or adders respectively for intersection testing of ray data. Secondly, a fixed-point format (e.g., for the direction component) may reduce the hardware complexity, as fixed-point arithmetic is generally cheaper than floating-point arithmetic for the same bit-width. Thirdly, reducing the number of bits of a ray component may reduce the required width of any arithmetic operations (e.g., multipliers, adders, etc.), decreasing total area costs.

Figure 12:
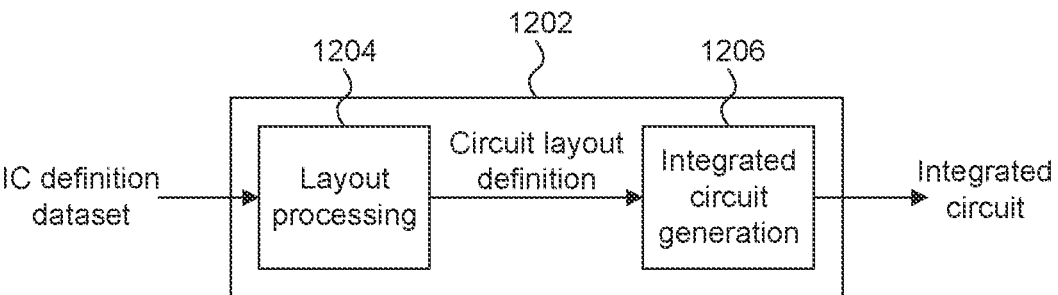
FIG. 12 shows an integrated circuit manufacturing system for generating an integrated circuit embodying a computing system.

FIG. 12 shows a computer system in which processing systems described herein may be implemented. The computer system may be a ray tracing system, or may comprise a ray tracing system, as illustrated in FIG. 1. The computer system comprises a CPU 1102, a GPU 1104, a memory 1106, a neural network accelerator (NNA) 1108 and other devices 1114, such as a display 1116, speakers 1118 and a camera 1122. A processing block 1110 is implemented on the CPU 1102. In other examples, one or more of the depicted components may be omitted from the system, and/or the processing block 1110 may be implemented on the GPU 1104 or within the NNA 1108. The components of the computer system can communicate with each other via a communications bus 1120. A store 1112 is implemented as part of the memory 1106. The computing system of FIGS. 1-12 are shown as comprising a number of functional blocks. This is schematic only and is not intended to define a strict division between different logic elements of such entities. Each functional block may be provided in any suitable manner. It is to be understood that intermediate values described herein as being formed by a computing system need not be physically generated by the computing system at any point and may merely represent logical values which conveniently describe the processing performed by the computing system between its input and output.

The computing systems described herein may be embodied in hardware on an integrated circuit. The computing systems described herein may be configured to perform any of the methods described herein. Generally, any of the functions, methods, techniques or components described above can be implemented in software, firmware, hardware (e.g., fixed logic circuitry), or any combination thereof. The terms "module," "functionality," "component", "element", "unit", "block" and "logic" may be used herein to generally represent software, firmware, hardware, or any combination thereof. In the case of a software implementation, the module, functionality, component, element, unit, block or logic represents program code that performs the specified tasks when executed on a processor. The algorithms and methods described herein could be performed by one or more processors executing code that causes the processor(s) to perform the algorithms/methods. Examples of a computer-readable storage medium include a random-access memory (RAM), read-only memory (ROM), an optical disc, flash memory, hard disk memory, and other memory devices that may use magnetic, optical, and other techniques to store instructions or other data and that can be accessed by a machine.

The terms computer program code and computer readable instructions as used herein refer to any kind of executable code for processors, including code expressed in a machine language, an interpreted language or a scripting language. Executable code includes binary code, machine code, byte-code, code defining an integrated circuit (such as a hardware description language or netlist), and code expressed in a programming language code such as C, Java or OpenCL. Executable code may be, for example, any kind of software, firmware, script, module or library which, when suitably executed, processed, interpreted, compiled, executed at a virtual machine or other software environment, cause a processor of the computer system at which the executable code is supported to perform the tasks specified by the code.

A processor, computer, or computer system may be any kind of device, machine or dedicated circuit, or collection or region thereof, with processing capability such that it can execute instructions. A processor may be or comprise any kind of general purpose or dedicated processor, such as a CPU, GPU, NNA, System-on-chip, state machine, media processor, an application-specific integrated circuit (ASIC), a programmable logic array, a field-programmable gate array (FPGA), or the like. A computer or computer system may comprise one or more processors.

It is also intended to encompass software which defines a configuration of hardware as described herein, such as HDL (hardware description language) software, as is used for designing integrated circuits, or for configuring programmable chips, to carry out desired functions. That is, there may be provided a computer readable storage medium having encoded thereon computer readable program code in the form of an integrated circuit definition dataset that when processed (i.e. run) in an integrated circuit manufacturing system configures the system to manufacture a computing system configured to perform any of the methods described herein, or to manufacture a computing system comprising any apparatus described herein. An integrated circuit definition dataset may be, for example, an integrated circuit description.

Therefore, there may be provided a method of manufacturing, at an integrated circuit manufacturing system, a computing system as described herein. Furthermore, there may be provided an integrated circuit definition dataset that, when processed in an integrated circuit manufacturing system, causes the method of manufacturing a computing system to be performed.

An integrated circuit definition dataset may be in the form of computer code, for example as a netlist, code for configuring a programmable chip, as a hardware description language defining hardware suitable for manufacture in an integrated circuit at any level, including as register transfer level (RTL) code, as high-level circuit representations such as Verilog or VHDL, and as low-level circuit representations such as OASIS (RTM) and GDSII. Higher level representations which logically define hardware suitable for manufacture in an integrated circuit (such as RTL) may be processed at a computer system configured for generating a manufacturing definition of an integrated circuit in the context of a software environment comprising definitions of circuit elements and rules for combining those elements in order to generate the manufacturing definition of an integrated circuit so defined by the representation. As is typically the case with software executing at a computer system so as to define a machine, one or more intermediate user steps (e.g. providing commands, variables etc.) may be required in order for a computer system configured for generating a manufacturing definition of an integrated circuit to execute code defining an integrated circuit so as to generate the manufacturing definition of that integrated circuit.

An example of processing an integrated circuit definition dataset at an integrated circuit manufacturing system so as to configure the system to manufacture a computing system will now be described with respect to FIG. 12.

FIG. 12 shows an example of an integrated circuit (IC) manufacturing system 1202 which is configured to manufacture a computing system as described in any of the examples herein. In particular, the IC manufacturing system 1202 comprises a layout processing system 1204 and an integrated circuit generation system 1206. The IC manufacturing system 1202 is configured to receive an IC definition dataset (e.g. defining a computing system as described in any of the examples herein), process the IC definition dataset, and generate an IC according to the IC definition dataset (e.g. which embodies a computing system as described in any of the examples herein). The processing of the IC definition dataset configures the IC manufacturing system 1202 to manufacture an integrated circuit embodying a computing system as described in any of the examples herein.

The layout processing system 1204 is configured to receive and process the IC definition dataset to determine a circuit layout. Methods of determining a circuit layout from an IC definition dataset are known in the art, and for example may involve synthesising RTL code to determine a gate level representation of a circuit to be generated, e.g. in terms of logical components (e.g. NAND, NOR, AND, OR, MUX and FLIP-FLOP components). A circuit layout can be determined from the gate level representation of the circuit by determining positional information for the logical components. This may be done automatically or with user involvement in order to optimise the circuit layout. When the layout processing system 1204 has determined the circuit layout it may output a circuit layout definition to the IC generation system 1206. A circuit layout definition may be, for example, a circuit layout description.

The IC generation system 1206 generates an IC according to the circuit layout definition, as is known in the art. For example, the IC generation system 1206 may implement a semiconductor device fabrication process to generate the IC, which may involve a multiple-step sequence of photo lithographic and chemical processing steps during which electronic circuits are gradually created on a wafer made of semiconducting material. The circuit layout definition may be in the form of a mask which can be used in a lithographic process for generating an IC according to the circuit definition. Alternatively, the circuit layout definition provided to the IC generation system 1206 may be in the form of computer-readable code which the IC generation system 1206 can use to form a suitable mask for use in generating an IC.

The different processes performed by the IC manufacturing system 1202 may be implemented all in one location, e.g. by one party. Alternatively, the IC manufacturing system 1202 may be a distributed system such that some of the processes may be performed at different locations, and may be performed by different parties. For example, some of the stages of: (i) synthesising RTL code representing the IC definition dataset to form a gate level representation of a circuit to be generated, (ii) generating a circuit layout based on the gate level representation, (iii) forming a mask in accordance with the circuit layout, and (iv) fabricating an integrated circuit using the mask, may be performed in different locations and/or by different parties.

In other examples, processing of the integrated circuit definition dataset at an integrated circuit manufacturing system may configure the system to manufacture a computing system without the IC definition dataset being processed so as to determine a circuit layout. For instance, an integrated circuit definition dataset may define the configuration of a reconfigurable processor, such as an FPGA, and the processing of that dataset may configure an IC manufacturing system to generate a reconfigurable processor having that defined configuration (e.g. by loading configuration data to the FPGA).

In some embodiments, an integrated circuit manufacturing definition dataset, when processed in an integrated circuit manufacturing system, may cause an integrated circuit manufacturing system to generate a device as described herein. For example, the configuration of an integrated circuit manufacturing system in the manner described above with respect to FIG. 12 by an integrated circuit manufacturing definition dataset may cause a device as described herein to be manufactured.

In some examples, an integrated circuit definition dataset could include software which runs on hardware defined at the dataset or in combination with hardware defined at the dataset. In the example shown in FIG. 12, the IC generation system may further be configured by an integrated circuit definition dataset to, on manufacturing an integrated circuit, load firmware onto that integrated circuit in accordance with program code defined at the integrated circuit definition dataset or otherwise provide program code with the integrated circuit for use with the integrated circuit.

The implementation of concepts set forth in this application in devices, apparatus, modules, and/or systems (as well as in methods implemented herein) may give rise to performance improvements when compared with known implementations. The performance improvements may include one or more of increased computational performance, reduced latency, increased throughput, and/or reduced power consumption. During manufacture of such devices, apparatus, modules, and systems (e.g. in integrated circuits) performance improvements can be traded-off against the physical implementation, thereby improving the method of manufacture. For example, a performance improvement may be traded against layout area, thereby matching the performance of a known implementation but using less silicon. This may be done, for example, by reusing functional blocks in a serialised fashion or sharing functional blocks between elements of the devices, apparatus, modules and/or systems. Conversely, concepts set forth in this application that give rise to improvements in the physical implementation of the devices, apparatus, modules, and systems (such as reduced silicon area) may be traded for improved performance. This may be done, for example, by manufacturing multiple instances of a module within a predefined area budget.

The applicant hereby discloses in isolation each individual feature described herein and any combination of two or more such features, to the extent that such features or combinations are capable of being carried out based on the present specification as a whole in the light of the common general knowledge of a person skilled in the art, irrespective of whether such features or combinations of features solve any problems disclosed herein. In view of the foregoing description it will be evident to a person skilled in the art that various modifications may be made within the scope of the invention.

What is claimed is:

1. A computer implemented method for converting ray data for a ray into a ray representative, wherein the ray representative is a compressed representation of the ray data, and wherein the ray data comprises three direction components and three position components for the ray, the method comprising:

identifying which of the three direction components of the ray data has the greatest magnitude, and defining the axis of the identified direction component as the major axis of the ray;

determining a translated position on the ray at which the position component along the major axis is zero; and rescaling the three direction components of the ray so that the magnitude of the direction component along the major axis is one;

wherein the ray representative comprises: (i) the two position components of the translated position along the axes which are not the major axis, and (ii) the two rescaled direction components along the axes which are not the major axis;

the method further comprising converting the ray representative into a quantised ray identifier by generating a data packet for the ray representative that includes data that indicates the major axis of the ray, the two position components of the translated position and the two rescaled direction components; and wherein the quantised ray identifier is used to obtain data to perform ray intersection testing for rendering an image of a scene.

2. The method of claim 1, wherein the ray representative comprises exactly two direction components and exactly two position components.

3. The method of claim 1, wherein the ray representative further comprises an indication of the major axis.

4. The method of claim 3, wherein the indication of the major axis comprises two bits.

5. The method of claim 1, wherein the ray data further comprises a minimum distance component and a maximum distance component, and the method further comprises rescaling the minimum and maximum distance components based on the translated position and on the rescaling of the three direction components of the ray.

6. The method of claim 1, wherein the rescaling of the three direction components of the ray is such that the value of the direction component along the major axis is plus one.

7. The method of claim 1, wherein the quantised ray identifier has a fixed bit-width.

8. The method of claim 1, wherein the data in the data packet for the quantised ray identifier comprises no more than three bits to indicate each of said two rescaled direction components along the axes which are not the major axis.

9. The method of claim 1, wherein the data in the data packet for the quantised ray identifier comprises no more than five bits to indicate each of said two position components of the translated position along the axes which are not the major axis.

10. The method of claim 1, wherein the quantised ray identifier identifies a set of rays, each ray of the set of rays comprising similar position and direction components.

11. The method of claim 1, further comprising generating a hash of the quantised ray identifier to represent the ray representative.

12. The method of claim 11, wherein generating the hash comprises performing logical XOR operations on the bits of the quantised ray identifier to reduce the number of bits of the quantised ray identifier.

13. The method of claim 11, wherein the hash comprises eight bits.

14. The method of claim 1, wherein the ray representative is used to store an indication of the ray in a cache, the cache being used to store data for intersection testing that is used by the ray tracing system to render an image of a scene.

15. A computer system for converting ray data for a ray into a ray representative, wherein the ray representative is a compressed representation of the ray data, wherein the ray data comprises three direction components and three position components for the ray, the computer system comprising processing logic configured to:

identify which of the three direction components of the ray data has the greatest magnitude, and define the axis of the identified direction component as the major axis of the ray;

determine a translated position on the ray at which the position component along the major axis is zero; and rescale the three direction components of the ray so that the magnitude of the direction component along the major axis is one;

wherein the ray representative comprises: (i) the two position components of the translated position along the axes which are not the major axis, and (ii) the two rescaled direction components along the axes which are not the major axis; and the processing logic being further configured to convert the ray representative into a quantised ray identifier by generating a data packet for the ray representative that includes data that indicates the major axis of the ray, the two position components of the translated position and the two rescaled direction components;

wherein the quantised ray identifier is used to obtain data to perform ray intersection testing for rendering an image of a scene.

16. The computer system of claim 15, wherein the ray representative comprises exactly two direction components and exactly two position components.

17. The computer system of claim 15, wherein the ray representative further comprises an indication of the major axis.

18. The computer system of claim 15, wherein the computer system is a ray tracing system.

19. A non-transitory computer readable storage medium having stored thereon an integrated circuit definition dataset that, when processed in an integrated circuit manufacturing system, configures the integrated circuit manufacturing system to manufacture a computer system for converting ray data for a ray into a ray representative, wherein the ray representative is a compressed representation of the ray data, wherein the ray data comprises three direction components and three position components for the ray, the computer system comprising processing logic configured to:

identify which of the three direction components of the ray data has the greatest magnitude, and define the axis of the identified direction component as the major axis of the ray;

determine a translated position on the ray at which the position component along the major axis is zero; and rescale the three direction components of the ray so that the magnitude of the direction component along the major axis is one;

wherein the ray representative comprises: (i) the two position components of the translated position along the axes which are not the major axis, and (ii) the two rescaled direction components along the axes which are not the major axis;

the processing logic being further configured to convert the ray representative into a quantised ray identifier by generating a data packet for the ray representative that includes data that indicates the major axis of the ray, the two position components of the translated position and the two rescaled direction components; and wherein the quantised ray identifier is used to obtain data to perform ray intersection testing for rendering an image of a scene.

\*  \*  \*  \*  \*